US008509943B2

(12) United States Patent
Oshida

(10) Patent No.: US 8,509,943 B2
(45) Date of Patent: Aug. 13, 2013

(54) MEDIA PROCESSING APPARATUS AND CONTROLLING METHOD OF THE SAME

(71) Applicant: Seiko Epson Corporation, Tokyo (JP)

(72) Inventor: Kazuya Oshida, Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 13/714,997

(22) Filed: Dec. 14, 2012

(65) Prior Publication Data

US 2013/0104154 A1   Apr. 25, 2013

Related U.S. Application Data

(62) Division of application No. 12/214,532, filed on Jun. 19, 2008, now Pat. No. 8,355,814.

(30) Foreign Application Priority Data

Jun. 19, 2007 (JP) ................................. 2007-161129

(51) Int. Cl.
*G06F 7/00* (2006.01)
(52) U.S. Cl.
USPC .......................................................... 700/213
(58) Field of Classification Search
USPC ............................ 700/213; 369/30.34, 30.03
See application file for complete search history.

(56) References Cited

U.S. PATENT DOCUMENTS

| 5,051,849 A * | 9/1991 | Fukushima et al. ............ 360/69 |
| 5,757,740 A * | 5/1998 | Osada .......................... 369/30.7 |
| 7,344,351 B2 * | 3/2008 | Rokusek et al. .............. 414/699 |
| 7,652,956 B2 * | 1/2010 | Yamada et al. ............. 369/30.32 |
| 2005/0157605 A1 | 7/2005 | Lilland et al. |
| 2007/0280057 A1 | 12/2007 | Ikeda |
| 2008/0320504 A1 | 12/2008 | Oshida |

FOREIGN PATENT DOCUMENTS

| JP | 04-137542 U | 12/1992 |
| JP | 2001-344829 A | 12/2001 |
| JP | 2002-074801 A | 3/2002 |
| JP | 2002-237104 A | 8/2002 |
| JP | 2003-045090 A | 2/2003 |
| JP | 2005-044392 A | 2/2005 |
| JP | 2006172559 A | 6/2006 |
| JP | 2006-202379 A | 8/2006 |

OTHER PUBLICATIONS

European Search Report, EP Application No. 08011043, Mailed Sep. 1, 2009.
Chinese Office Action issued Mar. 23, 2012 for Application No. 200810130215.X (7 Pages).

* cited by examiner

*Primary Examiner* — Ramya Burgess
(74) *Attorney, Agent, or Firm* — Nutter McClennen & Fish LLP; John J. Penny, Jr.

(57) ABSTRACT

A medium is transferred and loaded to a media tray provided with a media processing unit which is operable to perform information processing on the medium, by using a transfer arm of a media transfer mechanism. A distance from a surface of the medium loaded on the media tray to a reference position of the transfer arm is acquired. A difference between the acquired distance and a predetermined distance from a reference surface of the media tray to the reference position of the transfer arm is calculated. It is determined that a double transfer of the medium to the media tray occurs when the calculated difference is larger than a predetermined threshold value.

5 Claims, 17 Drawing Sheets

MEDIA PROCESSING APPARATUS AND CONTROLLING METHOD OF THE SAME

Priority is claimed under 35 U.S.C. §120 to U.S. patent application Ser. No. 12/214,532, filed Jun. 19, 2008, and under 35 U.S.C. §119 to Japanese Patent Application No. 2007-161129 filed Jun. 19, 2007, the disclosures of which, including specification, drawings and claims, are incorporated herein by reference in its entirety.

BACKGROUND

The present invention relates to a media processing apparatus that performs a predetermined process on media, such as CDs and DVDs and a controlling method of the same.

In recent years, disc dubbing apparatuses that write data on a plurality of media (information recording media), such as blank CDs (compact discs) or DVDs (digital versatile discs) and media processing apparatuses, such as CD/DVD publishers, that perform a data writing process and a label printing process to create media and publish the media have been used. As this type of media processing apparatus, an apparatus has been proposed which includes a drive that writes data on a medium, a printer that performs printing on a label surface of the medium, and a media transfer mechanism that holds the medium and transfers it to the driver and the printer (for example, see Patent Document 1).

Further, as a media take-out apparatus (disc take-out apparatus) that sequentially takes out a plurality of discs stored in a stacked state and transfers the media to a predetermined place, an apparatus has been proposed which includes: a disc lift mechanism that holds a plurality of discs in a stacked state and lifts up the discs; a disc detecting unit that detects the disc; a disc lift control unit that stops the operation of the disc lift mechanism when the disc detecting unit detects the top of the stacked discs; and a transfer mechanism that sequentially takes out the uppermost disc of the stacked discs from the disc lift mechanism and transfers it to a predetermined place, and in which the disc lift control unit controls the disc lift mechanism to be dropped a predetermined distance from the position where the disc lift mechanism stops due to the detection of the stacked discs by the disc detecting unit, and the disc detecting unit detects the thickness of the disc that is taken out and lifted up from the dropped position by the transfer mechanism (for example, see Patent Document 2).

The disc take-out apparatus disclosed in Patent Document 2 stops the stacked discs once, with an upper end of the stacked discs at a predetermined position where the disc detecting unit detects the discs, and then drops the discs by a predetermined distance. In addition, when the transfer mechanism takes out the uppermost disc of the stacked discs one by one at the dropped position and transfers the discs to a predetermined place, the transfer mechanism lifts up the disc once such that the disc detecting unit detects the disc, and then transfers the disc to a predetermined place. Therefore, when the transfer mechanism stops the stacked discs at a predetermined position, the disc detecting unit detects the upper end of the stacked discs. When the transfer mechanism transfers the uppermost disc, the disc detecting unit detects the thickness of the transferred disc to determine whether one disc or a plurality of discs are taken out.

Patent Document 1: Japanese Patent Publication No. 2006-202379A

Patent Document 2: Japanese Patent Publication No. 2005-44392A

The apparatus disclosed in Patent Document 2 prevents the double transfer of media when taking out one of a plurality of stacked media and transferring the medium. However, if the double transfer of the media occurs, a unit receiving the transferred medium is incapable of detecting the double transfer of the media. In the media processing apparatus disclosed in Patent Document 1, two or more media are transferred to a drive that writes data on media or a printer that performs printing on the label surfaces of media, the media interfere with a write head of the drive or a printer head of the printer, which results in the damage of an internal mechanism.

SUMMARY

Accordingly, an object of the invention is to provide a media processing apparatus capable of detecting the double transfer of media to a media tray of a media processing unit that performs information processing on the media, such as a media drive or a media printer, and preventing the damage of an internal mechanism of the media processing unit, and a controlling method of the same.

In order to achieve the object, according to an aspect of the invention, there is provided a controlling method of a media processing apparatus, comprising: transferring and loading a medium to a media tray provided with a media processing unit which is operable to perform information processing on the medium, by using a transfer arm of a media transfer mechanism; acquiring a distance from a surface of the medium loaded on the media tray to a reference position of the transfer arm; calculating a difference between the acquired distance and a predetermined distance from a reference surface of the media tray to the reference position of the transfer arm; and determining that a double transfer of the medium to the media tray occurs when the calculated difference is larger than a predetermined threshold value.

According the control method, after media are transferred to the media tray provided with the media processing unit, the distance from the surface of the media loaded on the media tray to the reference position of the transfer arm is measured. Then, the difference between the measured value and the distance from the reference surface of the media tray to the reference position is calculated, and it is determined that the double transfer of the media occurs when the difference is larger than a predetermined threshold value. As the position of the reference surface of the media tray, a measured value of a theoretical value may be stored during the shipment of a media processing apparatus. Therefore, the time required to perform a double transfer detecting process is substantially equal to the time required to measure the height of media, and thus it is possible to perform the double transfer detecting process in a relatively short time. As a result, it is possible to simply and rapidly detect the double transfer of media, and thus prevent the damage of an internal mechanism of the media processing unit.

In addition, the threshold value is obtained by adding the maximum thickness of a medium considering a variation in the thickness of the medium used and the warping of the medium to a distance from the height of the reference surface of the media tray to a lower surface of the medium. The threshold value may be the maximum height value of the medium when only one medium is on the media tray.

In the controlling method of a media processing apparatus according to the above-mentioned aspect, the transfer arm may be provided with a media detecting unit which is operable to detect a position of the surface of the media loaded on the media tray.

According to the above-mentioned control method, it is possible to easily measure the height of the media on the basis of the displacement of the transfer arm.

In the controlling method of a media processing apparatus according to the above-mentioned aspect, the media detecting unit may include: a detecting lever having a detecting terminal portion which is configured to come into contact with the surface of the medium and is movable from a non-detection position to a detection position when it comes into contact with the surface of the medium, and movably supported by the transfer arm; and a detector operable to detect that the detecting lever reaches the detection position; and the media detecting unit may detect a position of the detecting lever when the detecting lever is moved from one of the detection position and the non-detection position to the other of the detection position and the non-detection position by the movement of the transfer arm, as the position of the surface of the medium.

Further, preferably, the reference position of the transfer arm may be a position of a lower end of the detecting lever when the transfer arm is disposed at a predetermined position.

According to the above-mentioned control method, when the transfer arm is moved, the position of the detecting lever moved from one of the detection position and the non-detection position to the other one of the detection position and the non-detection position is detected as the position of the surface of the media. Therefore, it is possible to calculate the position of the reference surface of the media tray and the position of the surface of the media on the basis of the position of the transfer arm. As a result, it is possible to simplify a computing process for detecting the double transfer of media.

In the controlling method of a media processing apparatus according to the above-mentioned aspect, the controlling method may further comprise: stopping the transfer arm when detecting lever is moved to the detection position; and lifting up the transfer arm until the detecting lever is moved to the non-detection position, wherein in the acquiring, the distance from the position of the detecting lever when the detecting lever is moved to the non-detection position to the reference position is acquired as the distance from the surface of the medium to the reference position.

According to the above-mentioned control method, when the detecting lever is moved to the detection position, the transfer arm stops once, and then the transfer arm is lifted up using the detection position as a reference position. In this way, the distance from the surface of the media to the reference position is measured, which makes it possible to accurately measure the height of the media. In addition, it is possible to accurately measure the height of the media without being affected by the inertia of the detecting lever, as compared to the structure in which the transfer arm falls to measure the height of media.

According to another aspect of the invention, there is also provided a media processing apparatus comprising: a media processing unit including a media tray and operable to perform information processing on a medium loaded on the media tray; a media transfer mechanism including a transfer arm which is configured to hold the medium and transfer the medium to the media tray; a media detecting unit operable to detect a position of a surface of the medium loaded on the media tray; and a control unit operable to calculate a difference between a distance from the position of the surface of the medium detected by the media detecting unit to a reference position of the transfer arm and a distance from a reference surface of the media tray to the reference position of the transfer arm, and determine that a double transfer of the medium to the media tray occurs when the calculated difference is larger than a predetermined threshold value.

According to the media processing apparatus having the above-mentioned structure, after media are transferred to the media tray provided with the media processing unit, it is possible to calculate the distance from the surface of the media loaded on the media tray to the reference position using the media detecting unit. The control unit calculates the difference between the measured value and the distance from the reference surface of the media tray to the reference position, and determines that the double transfer of the media occurs when the difference is larger than a predetermined threshold value. Therefore, it is possible to simply and rapidly detect the double transfer of media, and thus prevent the damage of an internal mechanism of the media processing unit. In addition, as the height of the reference surface of the media tray, a measured value of a theoretical value may be stored during the shipment of a media processing apparatus. Therefore, the time required to perform a double transfer detecting process is substantially equal to the time required to measure the height of media, and thus it is possible to perform the double transfer detecting process in a relatively short time.

In the media processing apparatus according to the above-mentioned aspect, the media detecting unit may be provided in the transfer arm.

According to the media processing apparatus having the above-mentioned structure, it is possible to easily measure the distance from the surface of media on the basis of the displacement of the transfer arm. The media detecting unit may be either a contact type or anon-contact type.

In the media processing apparatus according to the above-mentioned aspect, the media detecting unit may include: a detecting lever having a detecting terminal portion which is configured to come into contact with the surface of the medium and is movable from a non-detection position to a detection position when it comes into contact with the surface of the medium, and movably supported by the transfer arm; and a detector operable to detect that the detecting lever reaches the detection position.

According to the media processing apparatus having the above-mentioned structure, when the transfer arm is moved, the position of the detecting lever displaced from one of the detection position and the non-detection position is detected as the position of the surface of the media. Therefore, it is possible to calculate the position of the reference surface of the media tray and the position of the surface of the media on the basis of the position of the transfer arm. As a result, it is possible to simplify a computing process for detecting the double transfer of media.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, a media processing apparatus and a controlling method of the same according to embodiments of the invention will be described with reference to the accompanying drawings.

Further, in the following embodiments, a disk publisher is used as an example of a media processing apparatus.

Figure 1:
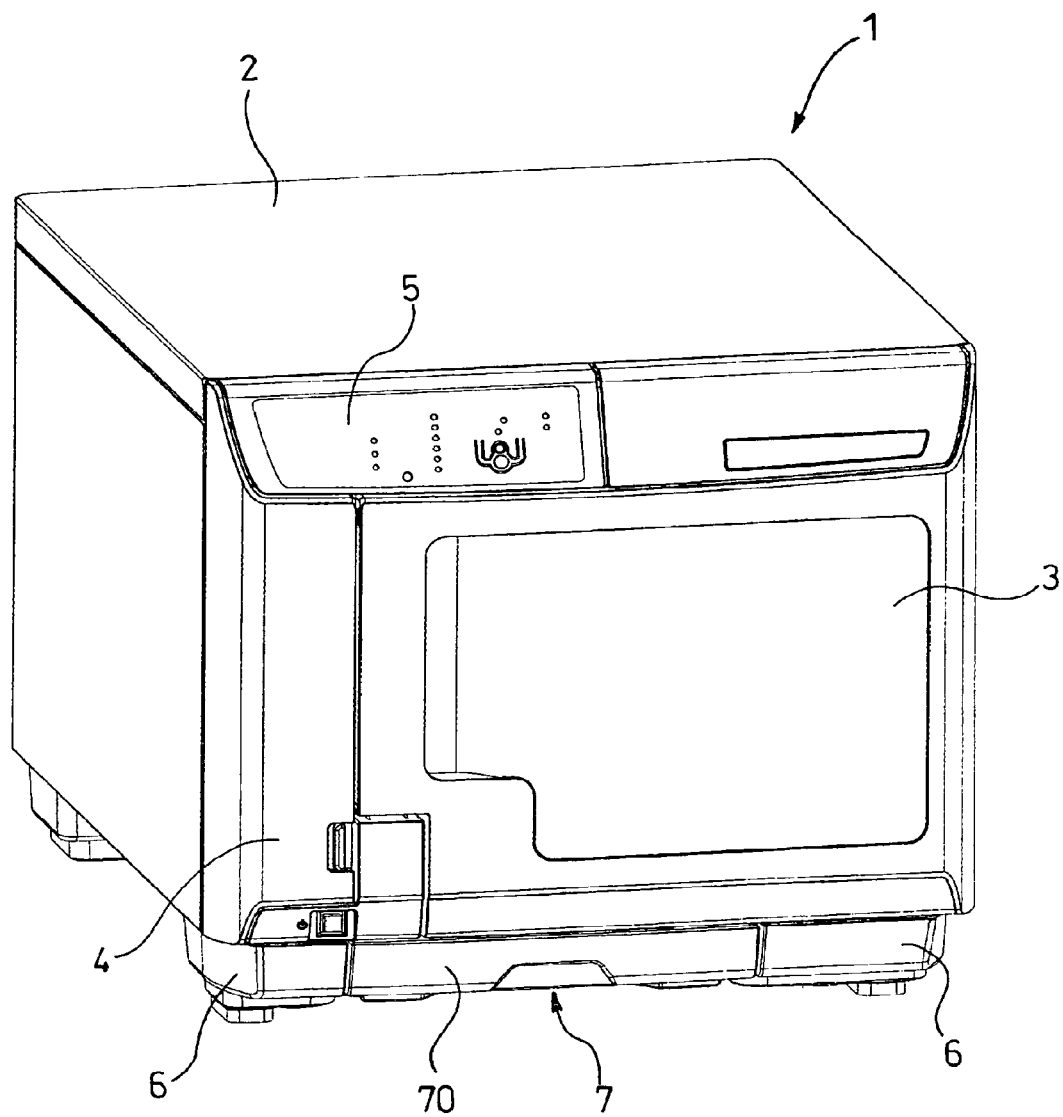
FIG. 1 is a perspective view illustrating the appearance of a publisher (media processing apparatus)
Figure 2:
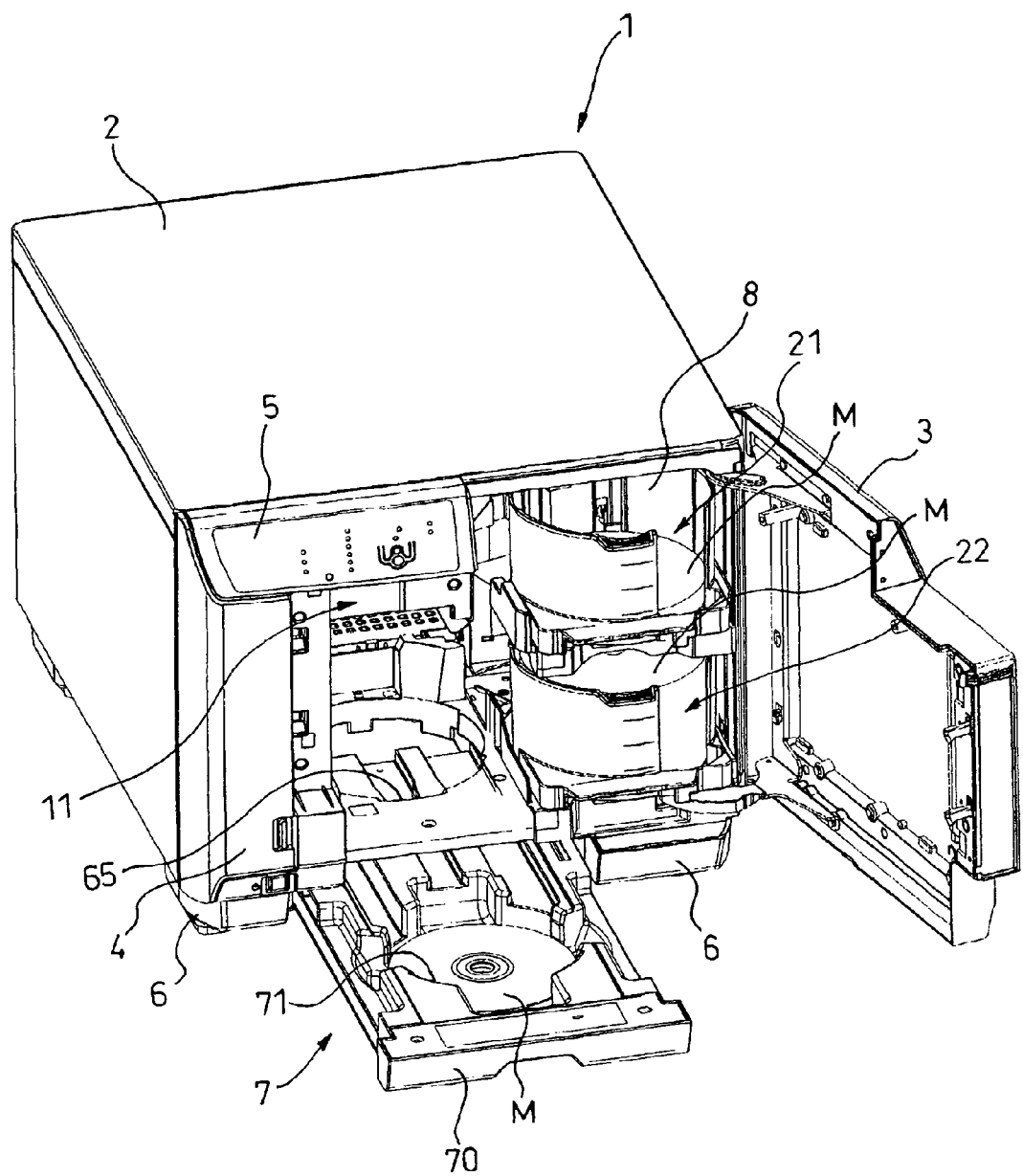
FIG. 2 is a perspective view illustrating the appearance of the publisher with each component being opened.
Figure 3:
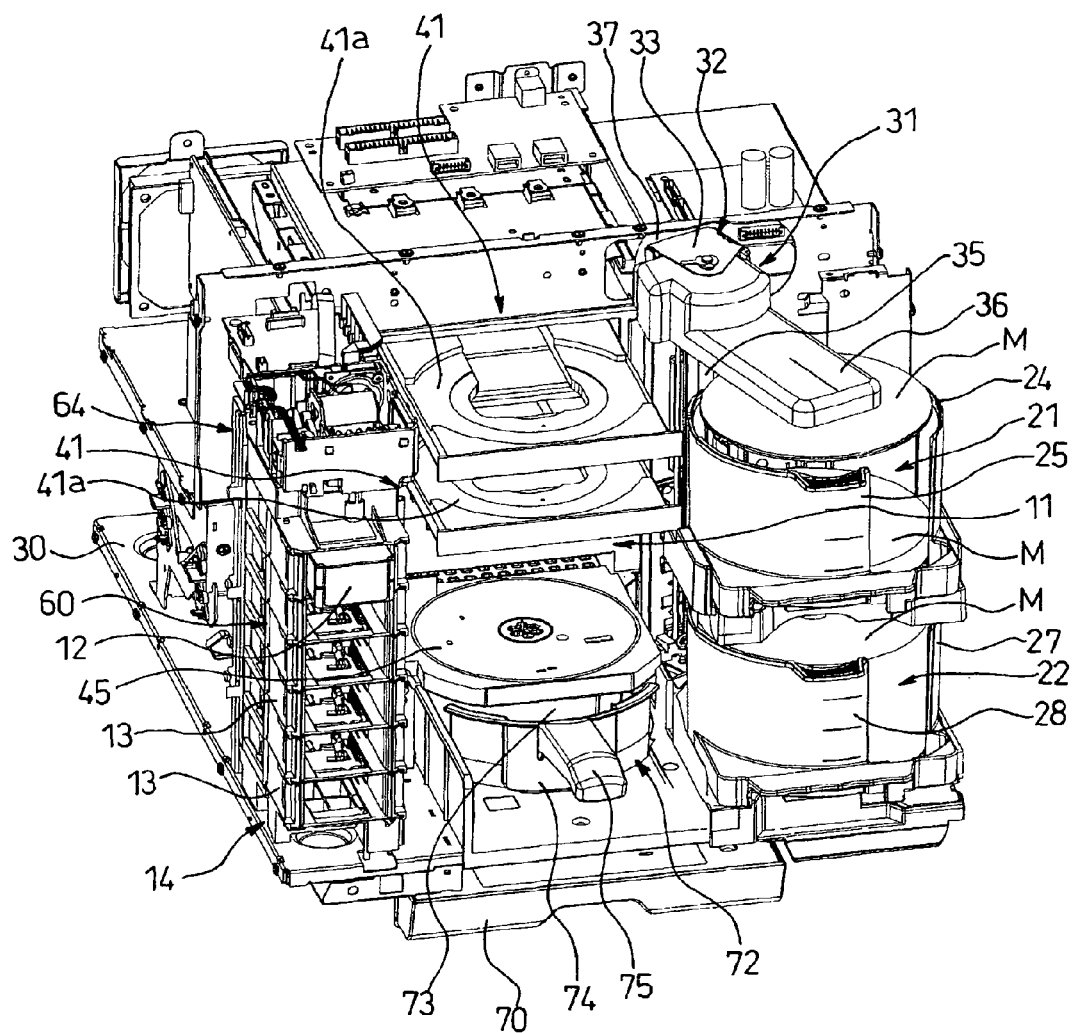
FIG. 3 is a perspective view illustrating the publisher with a case being removed, as viewed from an upper front side.
Figure 4:
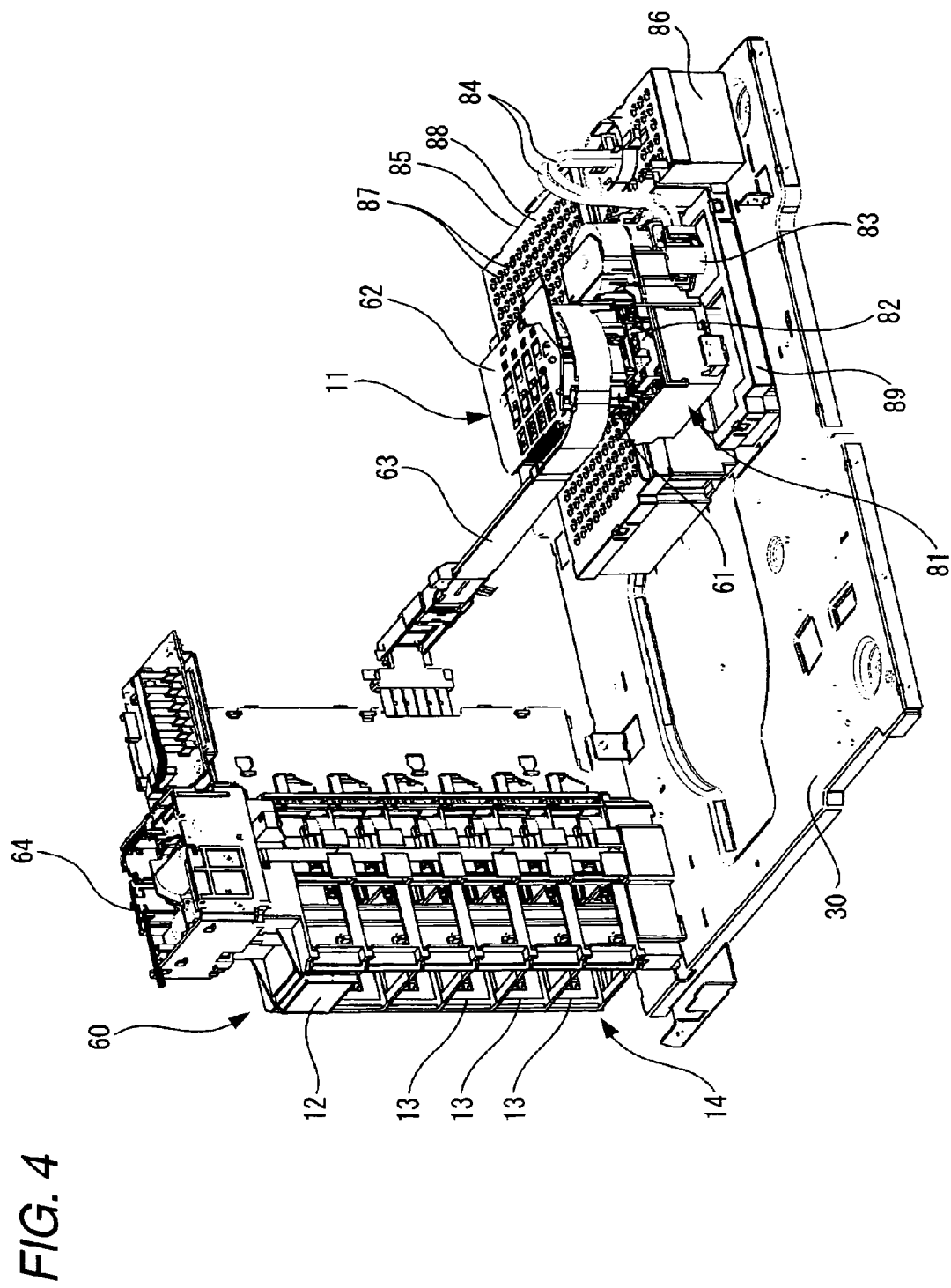
FIG. 4 is a perspective view illustrating a label printer provided in the publisher.

FIG. 1 is a perspective view illustrating the appearance of a publisher (media processing apparatus) with each component being closed. FIG. 2 is a perspective view illustrating the appearance of the publisher with each component being opened. FIG. 3 is a perspective view illustrating the publisher with a case being removed, as viewed from an upper front side. FIG. 4 is a perspective view illustrating a label printer provided in the publisher.

As shown in FIG. 1, a publisher 1 is a media processing apparatus that has a function of writing and/or reading data on and/or from disk media (information storage media), such as CDs or DVDs, and a function of printing images on the label surfaces of the media, and includes a substantially rectangular case 2. Openable doors 3 and 4 are hinged to the right and left sides of a front surface of the case 2. A control panel 5 having display lamps and operating buttons arranged thereon is provided at an upper left side of the case 2, and mounting legs 6 are provided at the right and left sides of a lower part of the case 2 so as to protrude from the bottom of the case. A drawing mechanism 7 is provided between the left and right legs 6.

As shown in FIG. 2, the right door 3, as viewed from the front side, closes up an opening 8 that is provided in the front surface of the publisher 1. For example, the door 3 is opened to set a blank medium M through the opening 8, or to take out a written medium M through the opening 8.

The left door 4, as viewed from the front side, is opened or closed to replace an ink cartridge 12 of the label printer 11 shown in FIG. 3. When the door 4 is opened, a cartridge mounting portion 14 having a plurality of cartridge holders 13 arranged in the vertical direction is exposed.

As shown in FIGS. 2 and 3, a media stacker 21, which serves as a media storage that can stack a plurality of blank media M (for example, 50 media) that are not subjected to a data writing process, and a media stacker 22, which serves as a media storage that stores a plurality of blank media M (for example 50 media) or the written media M, are arranged in the vertical direction inside the case 2 of the publisher 1 such that the media M stored in the media stackers are coaxial. The media stacker 21 and the media stacker 22 are detachably provided from their own positions.

The upper media stacker 21 includes a pair of left and right arc-shaped casing boards 24 and 25. In this way, the upper media stacker receives the media M from the upper side and can coaxially stack the media M. It is possible to easily insert or supply the media M to the media stacker 21 by opening the door 3 and taking out the media stacker 21.

The lower media stacker 22 has the same structure as the upper media stacker. That is, the lower media stacker 22 includes a pair of left and right arc-shaped casing boards 27 and 28. In this way, the lower media stacker receives the media M from the upper side and can coaxially stack the media M.

As shown in FIG. 3, a media transfer mechanism 31 is provided at the rear side of the media stacker 21 and the media stacker 22. The media transfer mechanism 31 includes a vertical guide shaft 35 that is vertically provided between a body frame 30 and a top board 33 of a chassis 32. A transfer arm 36 is supported by the vertical guide shaft 35 so as to be rotatable and movable in the vertical direction. The transfer arm 36 is movable up and down along the vertical guide shaft 35, and is rotatable on the vertical guide shaft 35 in the left and right directions by a driving motor 37.

Two media drives 41 that are stacked in the vertical direction are arranged on one side of the rear of the upper and lower media stackers 21 and 22 and the media transfer mechanism 31, and a carriage 62, which will be described below, of the label printer 11 is movably arranged below the media drives 41.

Each of the media drives 41 includes a media tray 41a that can move between a data write position where data is written on the medium M and a media delivery position where the medium M is loaded or taken out.

The label printer 11 includes a media tray 45 that is movable between a printing position where a label can be printed on a label surface of the medium M and a media delivery position where the medium M is loaded or taken out.

FIG. 3 shows the media trays 41a of the upper and lower media drives 41 that are drawn forward to be disposed at the media delivery positions and the media tray 45 of the label printer 11 below the media drives that is drawn forward to be disposed at the media delivery position. The label printer 11 is an ink jet printer, and various color (in this embodiment, six colors of black, cyan, magenta, yellow, light cyan, and light magenta) ink cartridges 12 are used as an ink supply mechanism 60. These ink cartridges 12 are mounted to the cartridge holders 13 of the cartridge mounting portion 14 from the front side.

Gaps in which the transfer arm 36 of the media transfer mechanism 31 is movable up and down are formed between the pair of left and right casing boards 24 and 25 of the media stacker 21 and between the pair of left and right casing boards 27 and 28 of the media stacker 22. In addition, a gap is formed between the upper media stacker 21 and the lower media stacker 22 such that the transfer arm 36 of the media transfer mechanism 31 can rotate in the horizontal direction to be positioned immediately above the media stacker 22. When the two media trays 41a are pushed into the media drives 41, the transfer arm 36 of the media transfer mechanism 31 is moved down to access the media tray 45 at the media delivery position.

The transfer arm 36 of the media transfer mechanism 31 can be moved down below the media tray 45, with the two media trays 41a positioned at a data write position and the media tray 45 positioned at the printing position. In addition, a guide hole 65 (see FIG. 2) for mounting a media stacker (separate stacker), which will be described below, is formed below the media delivery position of the media tray 45, through which the medium M passes through when the transfer arm 36 is moved down to release the medium M.

As shown in FIGS. 2 and 3, the drawing mechanism 7 includes a drawer tray 70 that is provided below the body frame 30. The drawer tray 70 can be pulled out from the body frame 30 to be opened or it can be pushed into the body frame 30 to be closed. A concave stacker portion 71 is provided in a lower part of the drawer tray 70. When the drawer tray 70 is at an accommodation position (closed position), the stacker portion 71 is positioned below the guide hole 65 such that the center of the stacker portion 71 is coaxial with the two media trays 41a and the media tray 45. The stacker portion 71 receives the media M supplied through the guide hole 65, and accommodates a relatively small number of media M (for example, about 5 to 10 media). The stacker portion 71 receives the media M from the upper side, and can store the media M that are coaxially stacked.

A media stacker (separate stacker) 72 that can store a larger number of media than the stacker portion 71 is detachably provided in the stacker portion 71 of the drawer tray 70 in an accommodated state and the guide hole 65 (see FIG. 3). The media stacker 72 also includes a pair of arc-shaped casing boards 73 and 74. In this way, the media stacker 72 can receive the media M from the upper side and store a plurality of media (for example, 50 media) in a stacked state. Gaps are formed between the pair of arc-shaped casing boards 73 and 74 to allow the transfer arm 36 of the media transfer mechanism 31 to be movable up and down. In addition, a grip 75 that is held by a user when the media stacker 72 is detached is provided in an upper part of the casing board 74.

When the media stacker 72 is mounted, a blank medium M is taken out from the lower media stacker 22, data is written on the medium M by the media tray 41, and a label is printed on the medium M by the label printer 11. Then, the medium M is accommodated in the media stacker 72.

For example, a maximum number of blank media M (50 media+50 media) are loaded in each of the upper media stacker 21 and the lower media stacker 22, and all the media M (50 media) in the lower media stacker 22 are sequentially processed and then accommodated in the media stacker 72. Then, all the media M (50 media) in the upper media stacker 21 are sequentially processed and then accommodated in the empty lower media stacker 22. In this way, the maximum number of media (50 media+50 media) in the upper media stacker 21 and the lower media stacker 22 are collectively processed (batch process mode).

When the media stacker 72 is in a detached state, a blank medium M is taken out from the upper media stacker 21 or the lower media stacker 22, and data writing and printing are performed on the blank medium M by the media drive 41 and the label printer 11, respectively. Then, the processed medium is stored in the stacker portion 71 of the drawer tray 70 in an accommodated state.

In this way, it is possible to take out the processed media M from the stacker portion 71 by pulling the drawer tray 70. That is, it is possible to take out the processed media M one by one or several by several, with the door 3 being closed, even though the media M are being processed (external discharge mode).

The media M are appropriately transferred among the media stacker 21, the media stacker 22, the stacker portion 71 (or the media stacker 72) of the drawer tray 70, the media trays 41a of the media drives 41, and the media tray 45 of the label printer 11, by a combination of the movement of the transfer arm 36 of the media transfer mechanism 31 in the vertical direction and the rotation thereof in the horizontal direction.

As shown in FIG. 4, the label printer 11 includes a carriage 62 having an ink jet head 61 that is provided with ink discharge nozzles (not shown), and the carriage 62 is reciprocated along a carriage guide shaft in the horizontal direction by a driving force of a carriage motor (not shown).

The label printer 11 includes the ink supply mechanism 60 having the cartridge mounting portion 14 to which the ink cartridges 12 are mounted. The ink supply mechanism 60 has a vertical structure, and is vertically arranged on the body frame 30 of the publisher 1. The ink supply mechanism 60 is connected to one end of a flexible ink supply tube 63, and the other end of the ink supply tube 63 is connected to the carriage 62.

Ink contained in the ink cartridge 12 mounted to the ink supply mechanism 60 is supplied to the carriage 62 through the ink supply tube 63. Then, the ink is supplied to the ink jet head 61 through a damper unit and a back pressure control unit (not shown) provided in the carriage 62 and then discharged from ink nozzles (not shown).

In addition, a pressure mechanism 64 is provided in the ink supply mechanism 60 such that its main portion is arranged at an upper part. The pressure mechanism 64 blows compressed air to apply pressure to the ink cartridge 12, thereby discharging ink stored in an ink tank pack of the cartridge 12.

Further, a head maintenance mechanism 81 is provided below the home position (the position shown in FIG. 4) of the carriage 62.

The head maintenance mechanism 81 includes: a head cap 82 that covers the ink nozzles of the ink jet head 61 that is exposed from the lower surface of the carriage 62 arranged at the home position; and a waste ink suction pump 83 that sucks ink which is discharged to the head cap 82 by a head cleaning operation or an ink supply operation of the ink jet head 61.

The ink sucked by the waste ink suction pump 83 of the head maintenance mechanism 81 is transferred to a waste ink suction tank 85 through the tube 84.

The waste ink suction tank 85 includes a case 86 and an absorber (not shown) provided in the case 86, and the upper surface of the waste ink suction tank is covered with a cover 88 having a plurality of vent holes 87 formed therein.

In addition, a waste ink receiving portion 89, which is a part of the waste ink suction tank 85, is provided below the head maintenance mechanism 81 to receive ink dropped from the head maintenance mechanism 81, and an absorber absorbs the ink.

(Media Transfer Mechanism)

Figure 5:
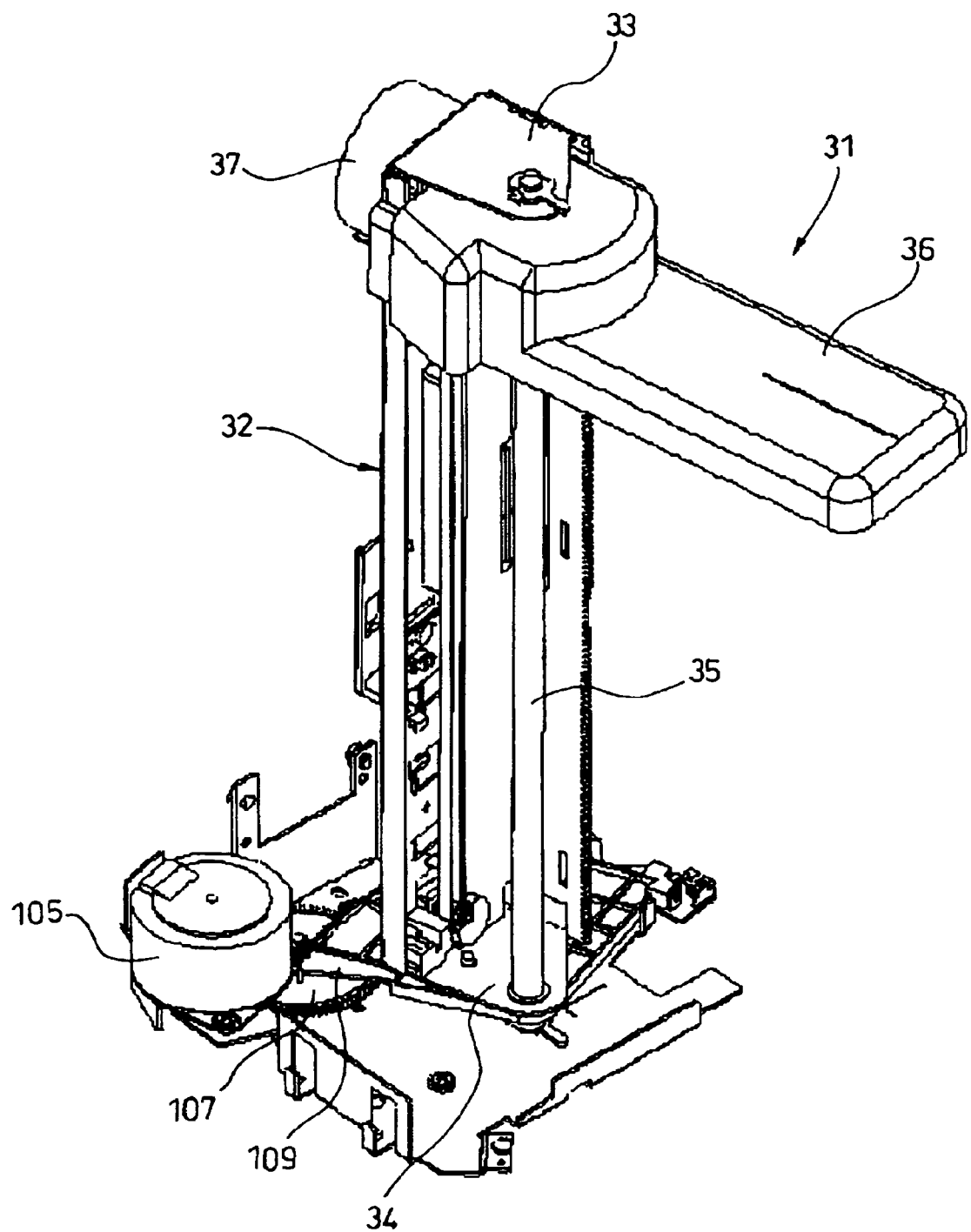
FIG. 5 is a perspective view illustrating a media transfer mechanism.

FIG. 5 is a perspective view illustrating the media transfer mechanism. As shown in FIG. 5, the media transfer mechanism 31 includes the chassis 32 that is vertically mounted, and the vertical guide shaft 35 is provided between a horizontal support plate 34 mounted to a base 30 and the top board 33 of the chassis 32. The transfer arm 36 is supported by the vertical guide shaft 35 so as to be rotatable and movable in the vertical direction.

A lift mechanism of the transfer arm 36 includes a driving motor 37 for a lift operation, which is a driving force source.

The rotation of the driving motor 37 is transmitted to a driving to side pulley that drives a timing belt wound around the chassis 32 in the vertical direction. A base 110 of the transfer arm 36 (see FIG. 6) is connected to a portion of the timing belt.

Therefore, when the driving motor 37 is driven, the timing belt is moved in the vertical direction, and the transfer arm 36 mounted to the timing belt is moved up or down along the vertical guide shaft 35. In addition, the driving motor 37 is a step motor, and it is possible to control the position of the transfer arm 36 in the vertical direction on the basis of the number of steps.

As shown in FIG. 5, a rotating mechanism of the transfer arm 36 includes a driving motor 105 for rotation, which is a driving force source. A pinion (not shown) is connected to an output shaft of the driving motor 105, and the rotation of the pinion is transmitted to the last fan-shaped gear 109 through a reduction gear train including a transfer gear 107. The last fan-shaped gear 109 can rotate on the vertical guide shaft 35 in the horizontal direction. In addition, the chassis 32 to which a component of the lift mechanism of the transfer arm 36 is coupled is mounted to the last fan-shaped gear 109. When the driving motor 105 is driven, the last fan-shaped gear 109 is rotated on the left or right, and the chassis 32 mounted to the last fan-shaped gear 109 is integrally rotated on the vertical guide shaft 35 in the horizontal direction. As a result, the transfer arm 36 that is held by the lift mechanism mounted to the chassis 32 is rotated on the vertical guide shaft 35 in the horizontal direction.

Next, each mechanism provided in the transfer arm 36 will be described.

Figure 6:
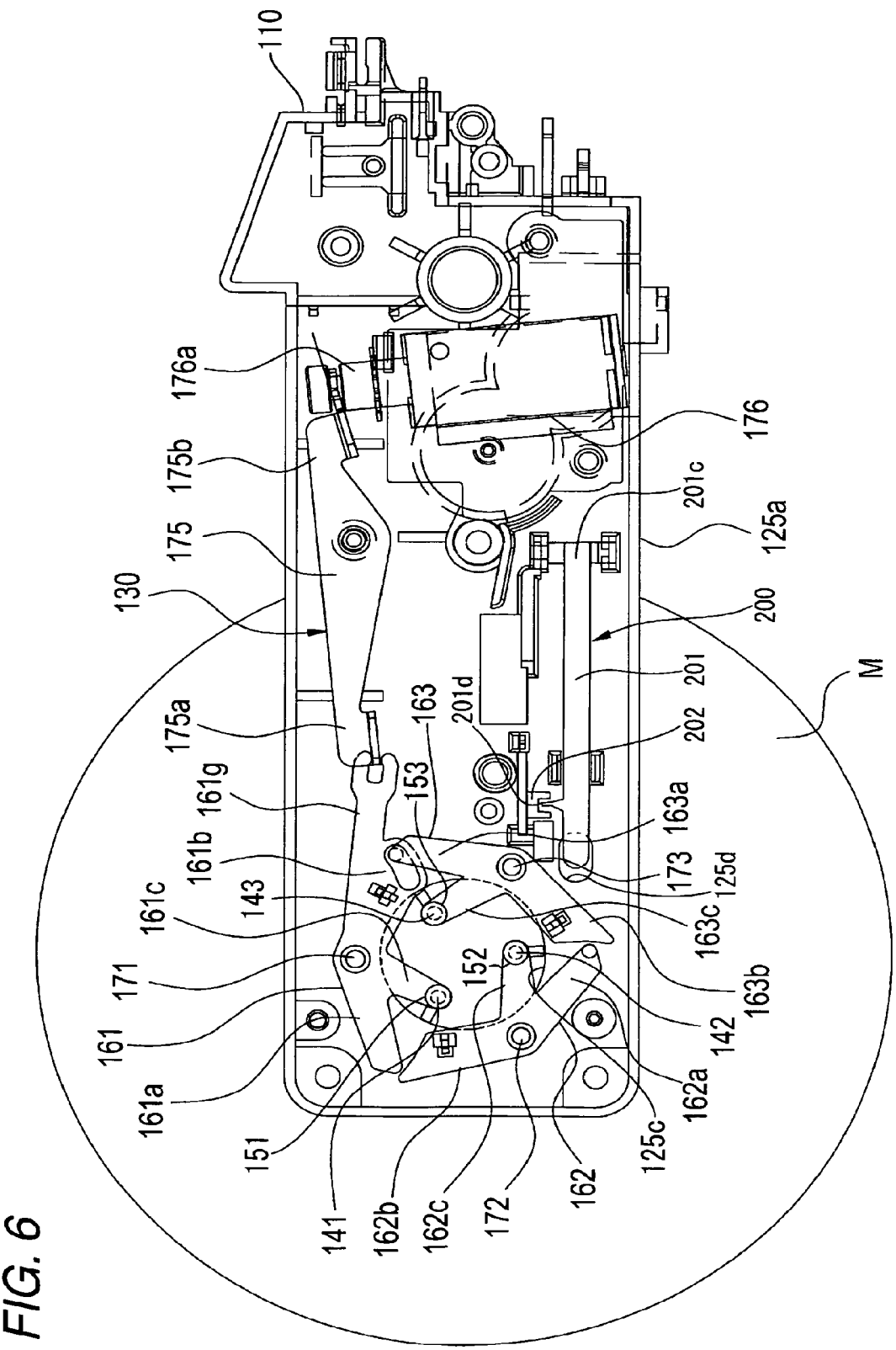
FIG. 6 is a plan view illustrating an arm base for explaining a gripping mechanism.
Figure 7:
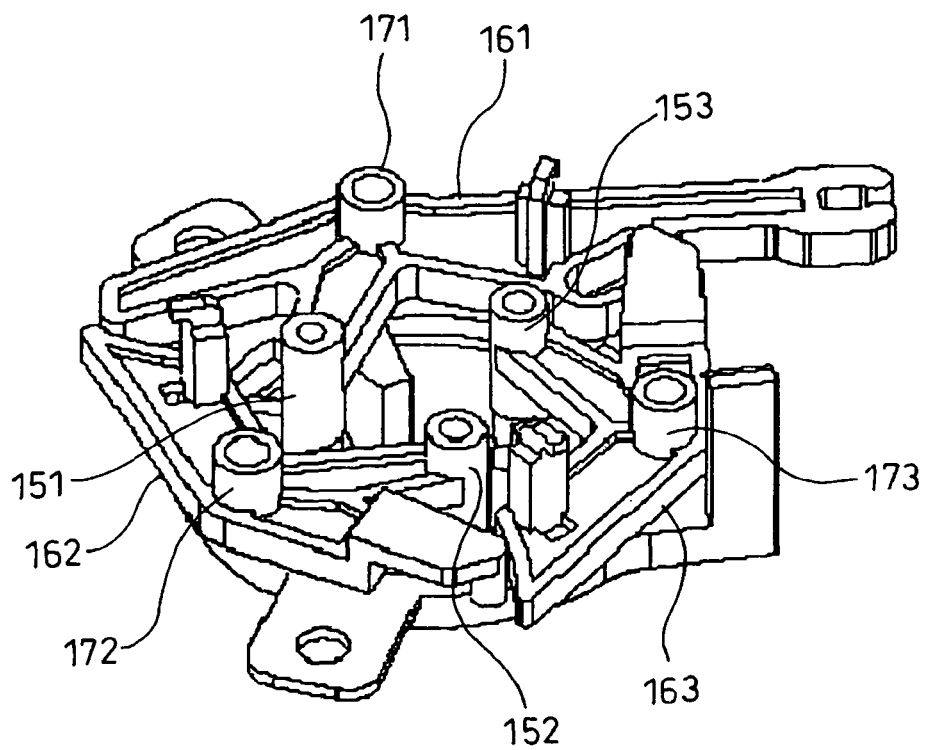
FIG. 7 is a perspective view illustrating holding claws of the gripping mechanism.
Figure 8:
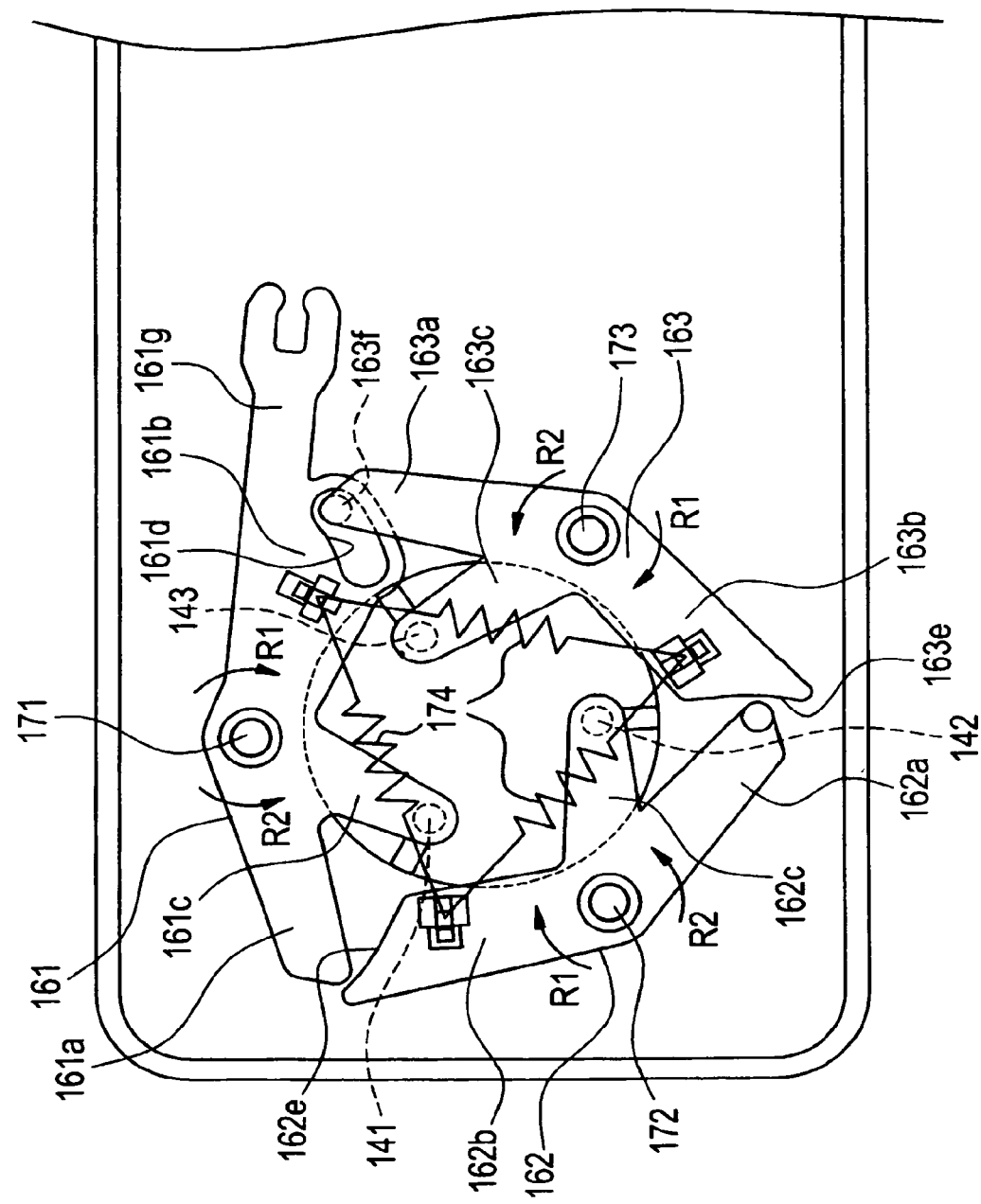
FIG. 8 is an enlarged plan view illustrating the holding claws.
Figure 9:
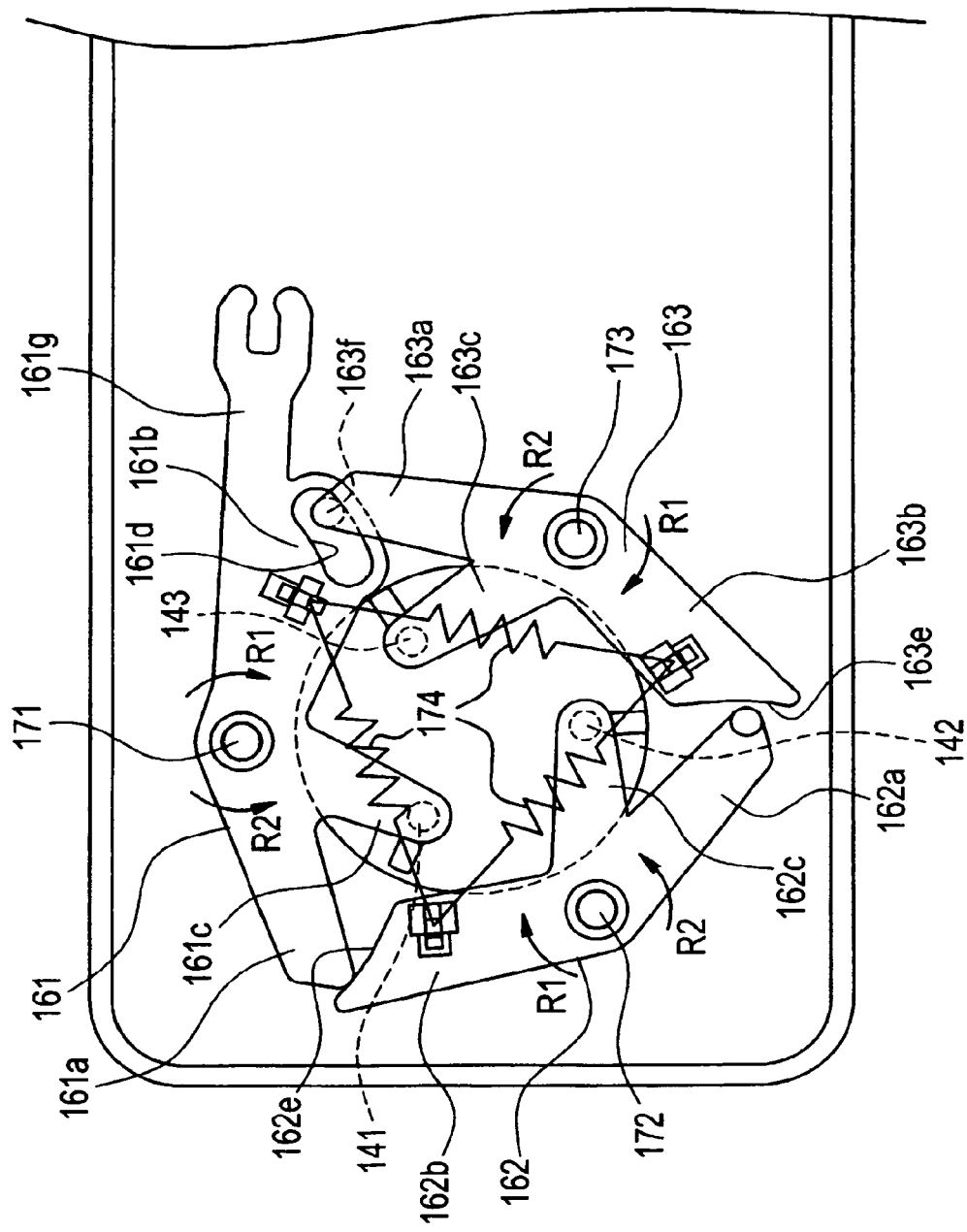
FIG. 9 is a plan view illustrating the operations of rotating plates and the holding claws.
Figure 10:
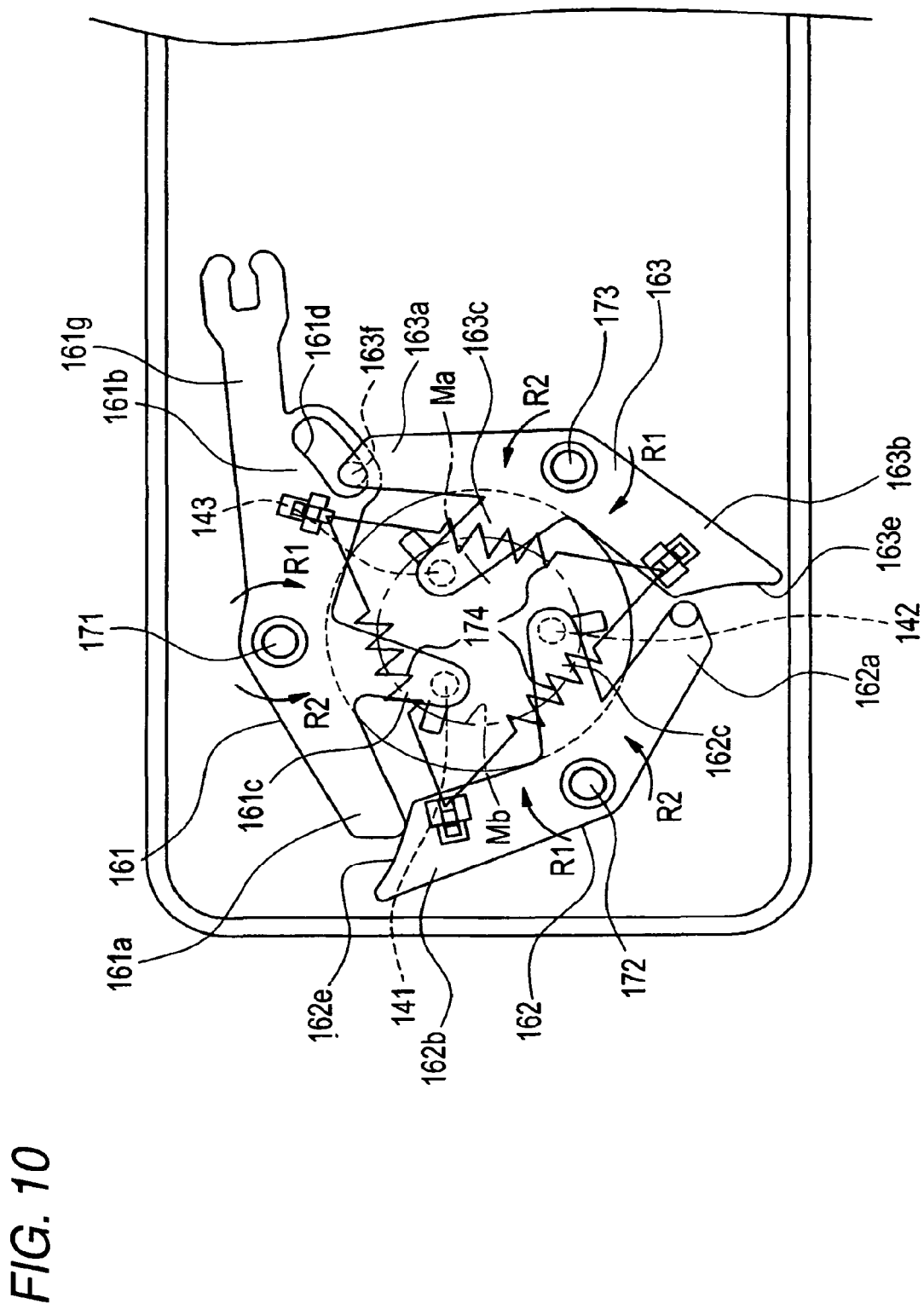
FIG. 10 is a plan view illustrating the operations of the rotating plates and the holding claws.
Figure 11:
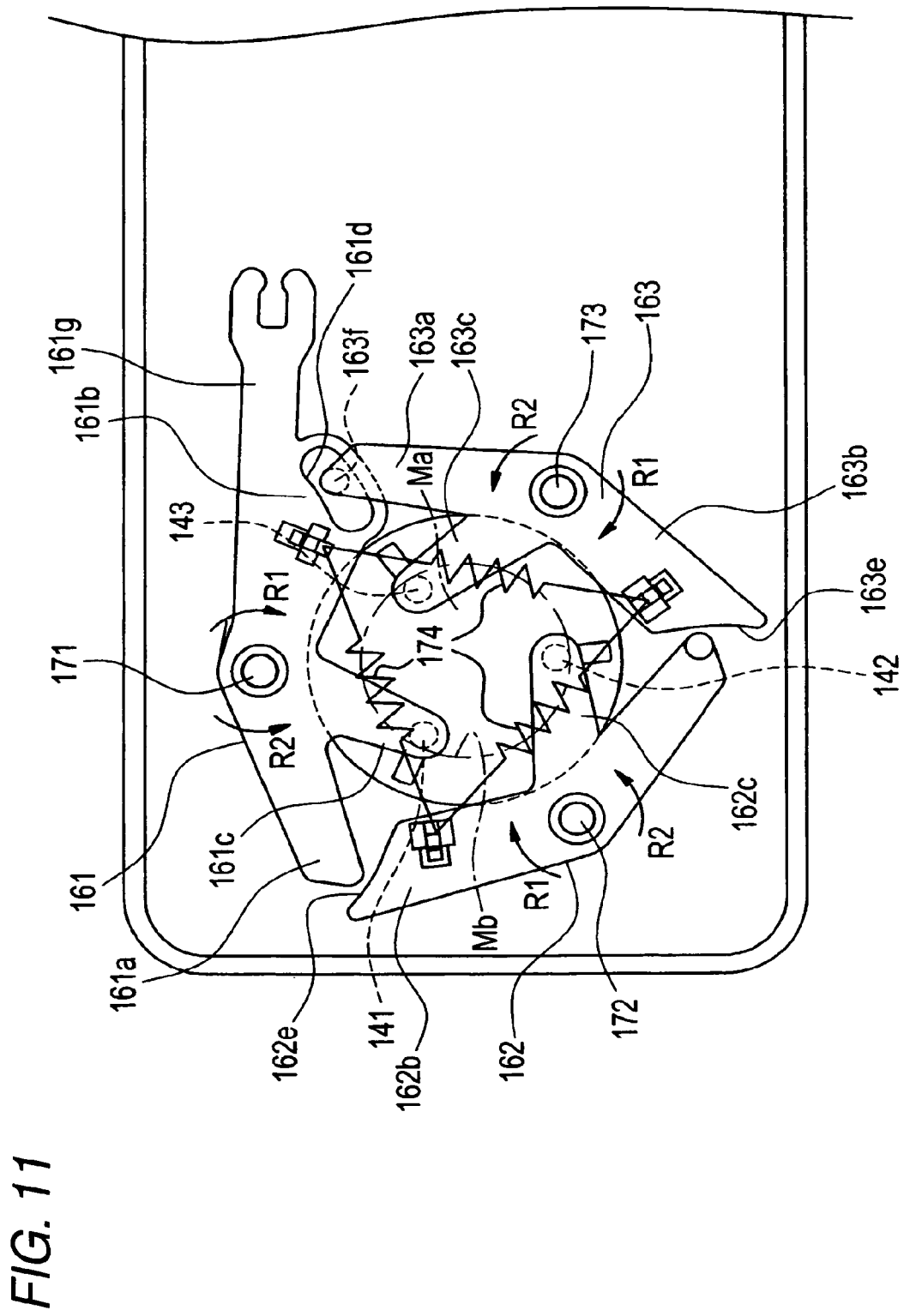
FIG. 11 is a plan view illustrating the operations of the rotating plates and the holding claws.

FIG. 6 is a plan view illustrating an arm base for explaining a gripping mechanism. FIG. 7 is a perspective view illustrating a holding claw portion of the gripping mechanism. FIG. 8 is an enlarged plan view illustrating the gripping mechanism. FIGS. 9 to 11 are plan views illustrating the operations of a rotating plate and the holding claw portion.

As shown in FIG. 6, the transfer arm 36 includes an elongated arm base 125a having a rectangular shape in plan view and an arm case (not shown) that covers the arm base 125a and has the same outline as the arm base 125a. In addition, a gripping mechanism 130 for holding the media M and a media detecting mechanism 200 are provided on the transfer arm 36.

The gripping mechanism 130 includes three cylindrical holding claws 141 to 143 that are arranged at an equal angle (120°) on the same circumference. The holding claws 141 to 143 protrude downward from a circular hole 125c that is formed at a leading end of the arm base 125a in the vertical direction. The holding claws 141 to 143 are inserted into a central hole of the medium M, and press the central of the medium M toward the outside in the radius direction to come into contact with an inner circumferential surface of the central hole of the medium M, thereby holding the medium M.

As shown in FIGS. 6 and 7, the holding claws 141 to 143 are mounted to lower ends of support pins 151 to 153, respectively. The support pins 151 to 153 pass through a circular hole 125c of the arm base 125a and extend in the vertical direction, and are fixed to three rotating plates 161 to 163 that are arranged on the upper surface of the arm base 125a, respectively. Rotation center shafts 171 to 173 are vertically fixed to the arm base 125a such that they surround the circular hole 125c and are arranged at an equal angle on the same circumference. The rotating plates 161 to 163 are supported such that they can rotate on the rotation center shafts 171 to 173, respectively.

As shown in FIGS. 6 to 8, the rotating plates 161 to 163 include: front arm portions 161a to 163a that extend forward (n a counterclockwise direction as viewed from the upper side) in a substantially circumferential direction of the circular hole 125c along the arm base 125a; rear arm portions 161b to 163b that that extend backward (in a clockwise direction as viewed from the upper side) in a substantially circumferential direction of the circular hole 125c; and support arm portions 161c to 163c that protrude from the rotation center to the inside of the circular hole 125c. Support pins 151 to 153 are vertically fixed to the rear surfaces of the leading ends of the support arm portions 161c to 163c.

A long hole 161d is formed in the rear arm portion 161b of the rotating plate 161 in a substantially diametric direction of the circular hole 125c, and a slide pin 163f that protrudes from the rear end of the front arm portion 163a of the rotating plate 163 is slidably fitted to the long hole 161d.

Further, a slide surface 163e is formed at the leading end of the rear arm portion 163b of the rotating plate 163 in a substantially diametric direction of the circular hole 125c such that the leading end of the front arm portion 162a of the rotating plate 162 does not come into contact with the is slide surface 163e. In addition, a slide surface 162e is formed at the leading end of the rear arm portion 162b of the rotating plate 162 in a substantially diametric direction of the circular hole 125c such that the leading end of the front arm portion 161a of the rotating plate 161 comes into slide contact with the slide surface 162e. In this embodiment, the long hole 161d of the rotating plate 161 and the slide surfaces 162e and 163e of the rotating plates 162 and 163 are formed in concavely curved shapes such that the rotating plates 161 to 163 rotate in the same direction.

Tensile coil springs (urging members) 174 are provided between the rear arm portion 161b of the rotating plate 161 and the rear arm portion 162b of the rotating plate 162, between the rear arm portion 162b of the rotating plate 162 and the rear arm portion 163b of the rotating plate 163, and between the rear arm portion 163b of the rotating plate 163 and the rear arm portion 161b of the rotating plate 161. The tensile force of the tensile coil springs 174 makes it possible to hold the rotating plates 161 to 163 without chattering and to apply an urging force to the rotating plates 161 to 163 in a direction of arrow R1 in FIG. 8 (in a direction in which the holding claws 141 to 143 are spread).

In the state shown in FIG. 8, circumscribed circles of the holding claws 141 to 143 that are respectively mounted to the leading ends of the support arm portions 161c to 163c of the rotating plates 161 to 163 have a diameter that is larger than an inside diameter of the central hole of the medium M. In this state, when the rotating plate 161 is rotated in a direction of an arrow R2, the other two rotating plates 162 and 163 are rotated in the same direction in operative association with the rotation of the rotating plate 161. As a result, the support arm portions 161c to 163c of the rotating plates 161 to 163 move toward the center of the circular hole 125c such that the holding claws 141 to 143 mounted to the leading ends of the rotating plates can be inserted into the central hole of the medium M.

In this state, when the holding claws 141 to 143 are inserted into the central hole of the medium M and the rotating plates 161 to 163 are rotated in an opposite direction R1, the holding claws 141 to 143 can be spread to the outside in a radius direction. As a result, the holding claws 141 to 143 press the inner circumferential surface of the central hole of the medium M to hold the medium M.

An operating arm portion 161g that extends in the opposite direction of the support arm portion 161c is formed in the rotating plate 161. A leading end of one arm portion 175a of a link 175 is rotatably connected to the leading end of the operating arm portion 161g. The link 175 is supported by the arm base 125a so as to be rotatable with its middle portion as rotation center, and a leading end of an arm portion 175b on the opposite side is connected to an operating rod 176a of an electromagnetic solenoid 176. When the electromagnetic solenoid 176 is in an off state, the operating rod 176a protrudes by the elastic force of a spring provided therein.

In this state, when the electromagnetic solenoid 176 is turned on, the operating rod 176a is drawn in against the elastic force of the spring. Then, the link 175 is rotated, and the rotating plate 161 is rotated in a direction R2. Then, as shown in FIG. 9, the slide surface 162e of the rear arm portion 162b of the rotating plate 162 comes into slide contact with the leading end of the front arm portion 161a of the rotating plate 161, and the inner surface of the long hole 161d in the rear arm portion 161b of the rotating plate 161 comes into slide contact with the slide pin 163f of the front arm portion 163a of the rotating plate 163. In this way, the slide surface 162e of the rotating plate 162 comes into slide contact with the leading end of the front arm portion 161a of the rotating plate 161 to slide to the outside in the diametric direction of the circular hole 125c. Then, the rotating plate 162 is rotated in the direction R2. In addition, the inner surface of the long hole 161d in the rear arm portion 161b of the rotating plate 161 comes into slide contact with the slide pin 163f of the front arm portion 163a of the rotating plate 163, and the front arm portion 163a of the rotating plate 163 slides in the central direction of the circular hole 125c, so that the rotating plate 163 is also rotated in the direction R2.

In this way, when the rotating plate 161 is rotated in the direction R2, the turning force of the rotating plate 161 in the direction R2 is transmitted to the other rotating plates 162 and 163. Then, as shown in FIG. 10, the rotating plates 162 are 163 are also rotated in the direction R2, and the holding claws 141 to 143 respectively provided in the support arm portions 161c to 163c of the rotating plates 161 to 163 are arranged within a circumscribed circle having a diameter that is sufficiently smaller than that of the central hole of the medium M to be inserted into the medium M.

In this state, when the electromagnetic solenoid 176 is turned off, the operating rod 176a protrudes by the elastic force of the spring, and the link 175 is rotated. Then, the turning force of the link 175 is transmitted to the rotating plate 161 to rotate the rotating plate 161 in the direction R1. In operative association with the rotation of the rotating plate 161, the rear arm portions 162b and 163b of the other two rotating plates 162 and 163 are stretched in the central direction of the circular hole 125c by the tensile force of the tensile coil springs 174, and the rotating plates 162 and 163 are also rotated in the direction R1, similar to the rotating plate 161. As a result, as shown in FIG. 11, the holding claws 141 to 143 are spread to press the inner circumferential surface Mb of the central hole of the medium M, thereby holding the medium M.

In this case, the rotating plates 162 are 163 are rotated in the direction R1 independently from the rotating plate 161 by the tensile force of the tensile coil springs 174. Therefore, the holding claws 141 to 143 also move independently to the outside in the radius direction to press the inner circumferential surface of the central hole of the medium M.

Figure 12:
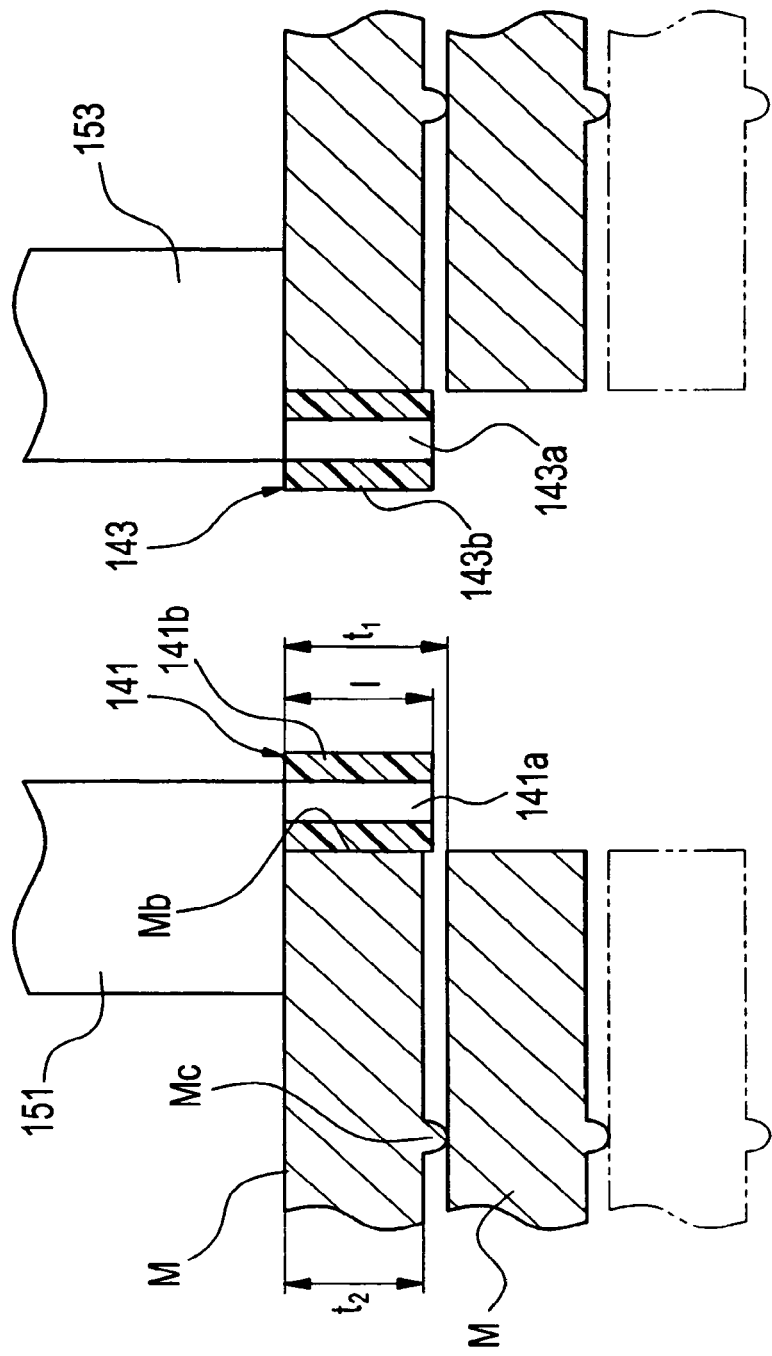
FIG. 12 is a cross-sectional view illustrating the holding claws.

As shown in FIG. 12, the three holding claws 141 to 143 include cylindrical pins 141a to 143a that respectively protrude from the lower ends of the support pins 151 to 153, and elastic cylinders 141b to 143b that are formed of, for example, rubber and concentrically surround the pins 141a to 143a, respectively. Here, although the cylindrical pin 142a and the elastic cylinder 142b are not shown in FIG. 12, these components are provided with the holding claw 142 in a similar configuration as the holding claws 141 and 143. The length l of protruding portions of the three holding claws 141 to 143 is equal to or smaller than the thickness t1 of the held media M. It is preferable that the length l be equal to or larger than the thickness t2 of an inner circumferential surface Mb of a central hole Ma of the medium M and equal to smaller than the thickness t1 of the medium M including the height of a ring-shaped protruding portion Mc. In this way, when holding the media M that are stacked in the thickness direction, the holding claws 141 to 143 can hold only the uppermost medium M without contacting the inner circumferential surfaces Mb of two media M.

Figure 13:
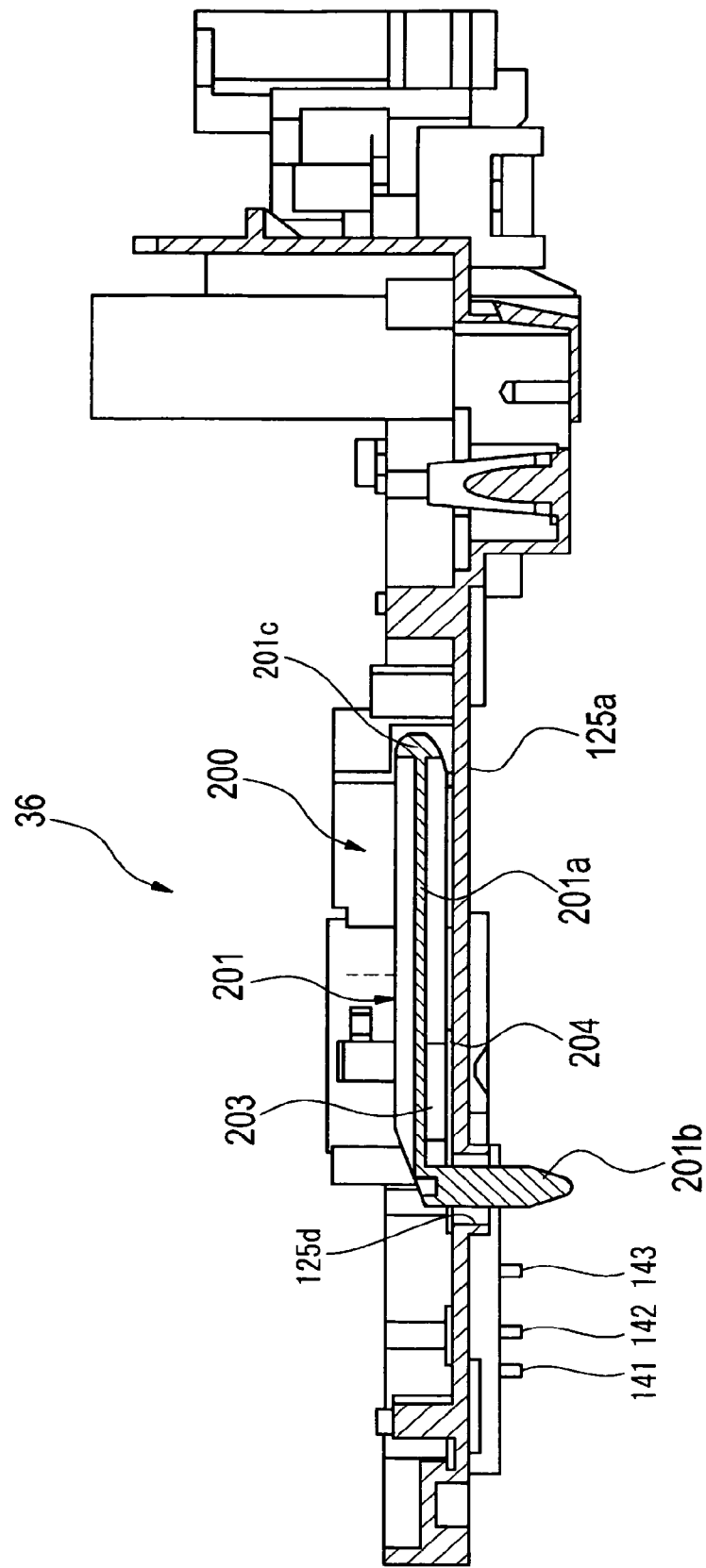
FIG. 13 is a cross-sectional view illustrating the structure of a media detecting mechanism.

FIG. 13 is a cross-sectional view illustrating the structure of a media detecting mechanism.

As shown in FIGS. 6 and 13, a media detecting mechanism (media detecting unit) 200 includes a detecting lever 201 and a detector (media detector) 202 that is provided on the side of the detecting lever 201. The detecting lever 201 includes: a lever body 201a having a rear end 201c that is supported with a horizontal axis as a center and a leading end that can be tilted in the vertical direction; and an abutting portion 201b serving as a detection terminal, which is an end portion of the lever body 201a that is bent downward to protrude from a lower surface of the arm base (base plate) 125a.

At a non-detection position shown in FIG. 13, the lever body 201a of the detecting lever 201 is laid on the arm base 125a, and the abutting portion 201b protrudes a predetermined distance toward the lower side of the arm base 125a, that is, a media holding side, through an opening 125d formed in the arm base 125a. In addition, the detector 202 is a transmissive optical sensor. When the detecting lever 201 is positioned at the non-detection position, as shown in FIG. 13, in the detector, a detecting plate 201d shown in FIG. 6 that protrudes toward a side surface of the leading end of the lever body 201a shields detection light in the detection range of the detector 202. Therefore, a detection signal of the detector 202 is turned off.

In the media detecting mechanism 200, when the transfer arm 36 moves down and the upper surface of the medium M comes into contact with the abutting portion 201b that is formed at the leading end of the detecting lever 201, the detecting lever 201 is tilted upward to be displaced from the non-detection position (position shown in FIG. 13) where the detecting lever comes into contact with the arm base 125a to a detection position (position shown in FIG. 14) where the detecting lever is separated from the arm base 125a. When the detecting plate 201d of the detecting lever 201 is out of the detection range of the detector 202, the detector 202 is turned on. It is possible to detect the approach of the detector to the medium M, that is, the presence of the medium M held by the gripping mechanism 130, on the basis of the detection signal of the detector 202.

Further, in the media detecting mechanism 200, a magnet (attracting unit) 203 is provided in the lever body 201a of the detecting lever 201. The magnet 203 is composed of a resin magnet that is formed of a mixture of a synthetic resin and a magnetic material, and is fixed to the lever body 201a of the detecting lever 201. In addition, a steel plate (attracted portion) 204, which is an attracted member attracted by the magnet 203, is provided on the upper surface of the arm base 125a at a position opposite to the magnet 203 that is provided in the lever body 201a of the detecting lever 201.

In the media detecting mechanism 200, at the non-detection position where the detecting lever 201 comes into contact with the arm base 125*a* and the abutting portion 201*b* of the detecting lever 201 protrudes from the lower surface of the arm base 125*a*, the steel plate 204 is attracted to the magnet 203 by the magnetic force of the magnet 203. Therefore, at the non-detection position where the abutting portion 201*b* protrudes from the lower surface of the arm base 125*a*, the detecting lever 201 is maintained in a state in which the tilting of the detecting lever is restricted by an attraction force between the magnet 203 and the steel plate 204.

Figure 14:
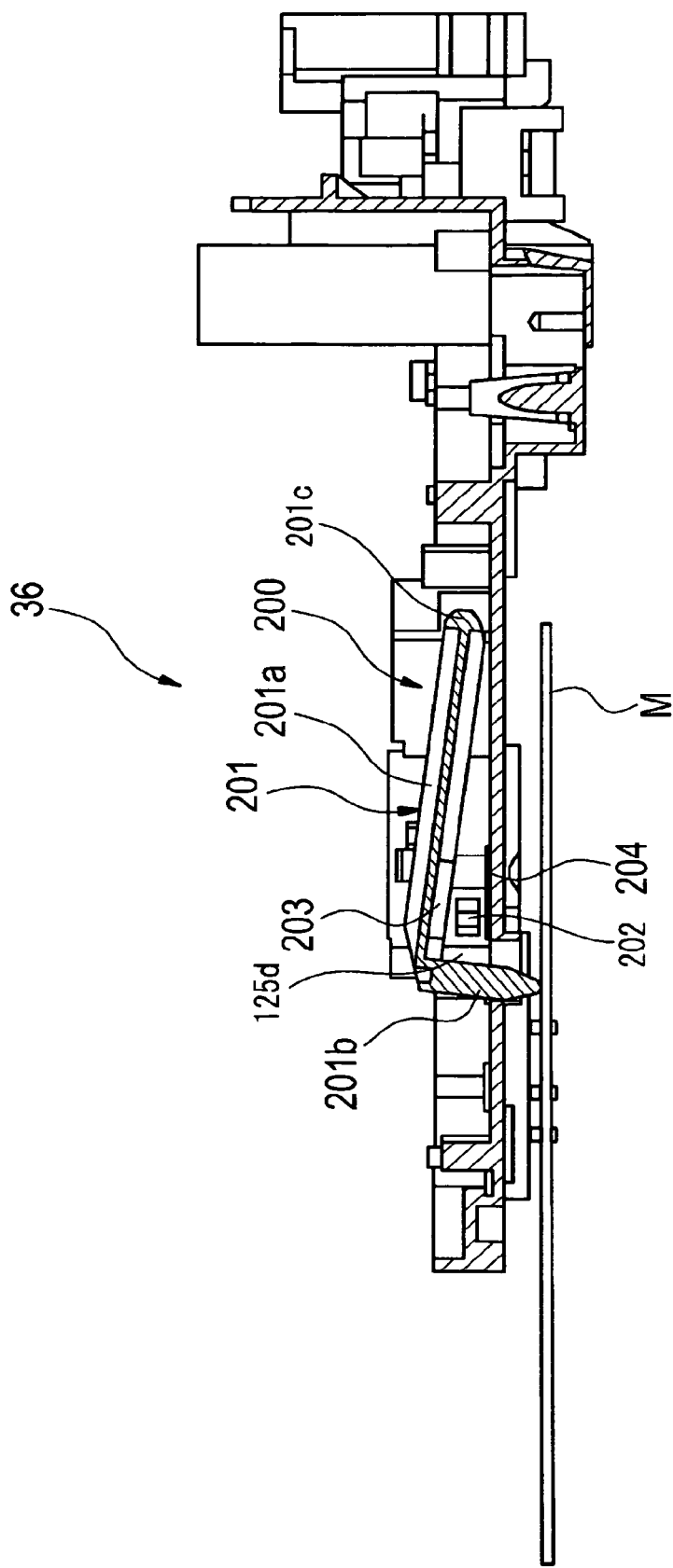
FIG. 14 is a cross-sectional view illustrating the operation of the media detecting mechanism.

In this state, when the transfer arm 36 moves down and the upper surface of the medium M comes into contact with the abutting portion 201*b* provided at the leading end of the detecting lever 201, as shown in FIG. 14, a pressing force is applied upward against the leading end of the detecting lever 201. When the pressing force detaches the steel plate 204 from the magnet 203, the detecting lever 201 is tilted in the vertical direction on a connection portion between the rear end of the lever body 201*a* and the arm base 125*a*. Then, the detecting lever 201 is displaced from the non-detection position where the detecting lever comes into contact with the arm base 125*a* to the detection position where the detecting lever is separated from the arm base 125*a*.

On the contrary, the gripping mechanism 130 releases the held medium M, and the transfer arm 36 moves up to separate the gripping mechanism from the medium M. Then, the detecting lever 201 that is tilted upward to be disposed at the detection position is tilted downward by its weight. When the detecting lever 201 is tilted downward to be disposed at the non-detection position, the magnet 203 of the lever body 201*a* comes into contact with the steel plate 204, and the steel plate 204 is attracted to the magnet 203 by the magnetic force of the magnet 203. In this way, the detecting lever 201 is maintained in a state in which the tilting of the detecting lever is restricted by the attraction force between the magnet 203 and the steel plate 204.

Next, a control system of the publisher 1 for performing a control method according to this embodiment will be described.

Figure 15:
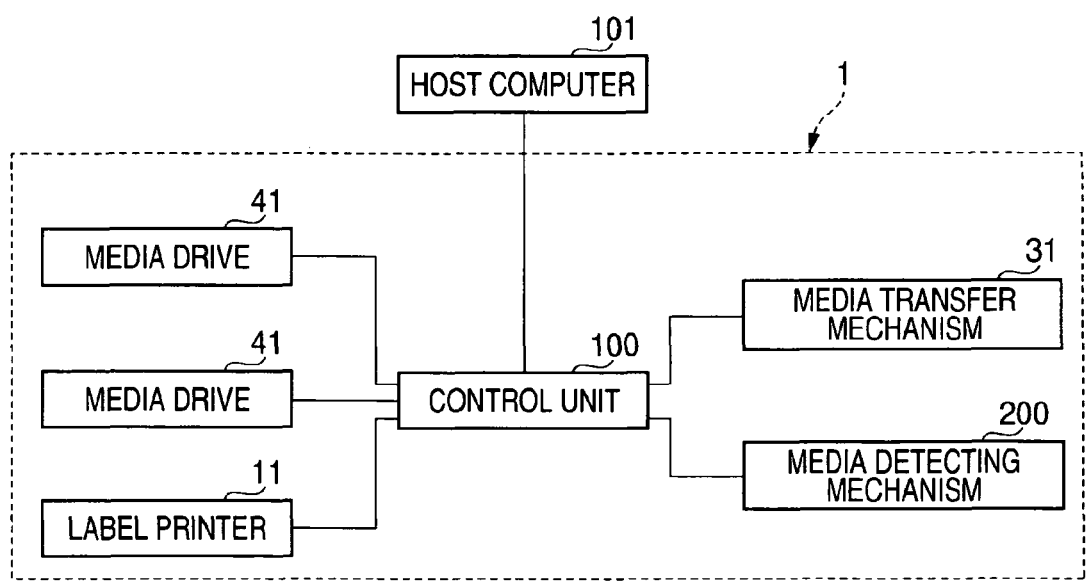
FIG. 15 is a block diagram illustrating a control system of the publisher.

As shown in FIG. 15, the publisher 1 includes a control unit 100 that controls the operation of each component. The control unit 100 is connected to a host computer 101 installed outside the publisher 1 such that it can communicate with the host computer 101. The control unit 100 is composed of a microcomputer including a CPU, a ROM, a RAM, and an EEPROM. The control unit 100 controls the transfer mechanism 31 to transfer media M, the media drive 41 to write data on the media M, and the label printer 11 to print labels on the label surfaces of the media M, on the basis various execution instructions from the host computer 101. In addition, the control unit 100 is connected to the media detecting mechanism 200 to control the operation of the media transfer mechanism 31 on the basis of the detection signal from the media detecting mechanism 200 or to output error signals.

When receiving execution instructions from the host computer 101, the control unit 100 performs a data writing process or a printing process on the medium M according to a predetermined process mode, such as a batch process mode. At that time, the control unit 100 performs a transfer process to control the media transfer mechanism 31 to transmit the media M stored in the upper media stacker 21 or the lower media stacker 22 to the media trays 41*a* of the media drives 41 or the media tray 45 of the label printer 11. Since a plurality of media M are stacked in the media stackers 21 and 22, the media are likely to be closely adhered to each other. Therefore, it is considered that the media transfer mechanism 31 simultaneously transfers two media. In order to solve this problem, in the control method according to this embodiment, after a transfer process in which the transfer arm 36 of the media transfer mechanism 31 transfers the media M to the media trays 41*a* and 45 and stacks the media M on the media trays 41*a* and 45, a double transfer detecting process of determining the double transfer of the media M to the media trays 41*a* and 45 is performed.

Figure 16:
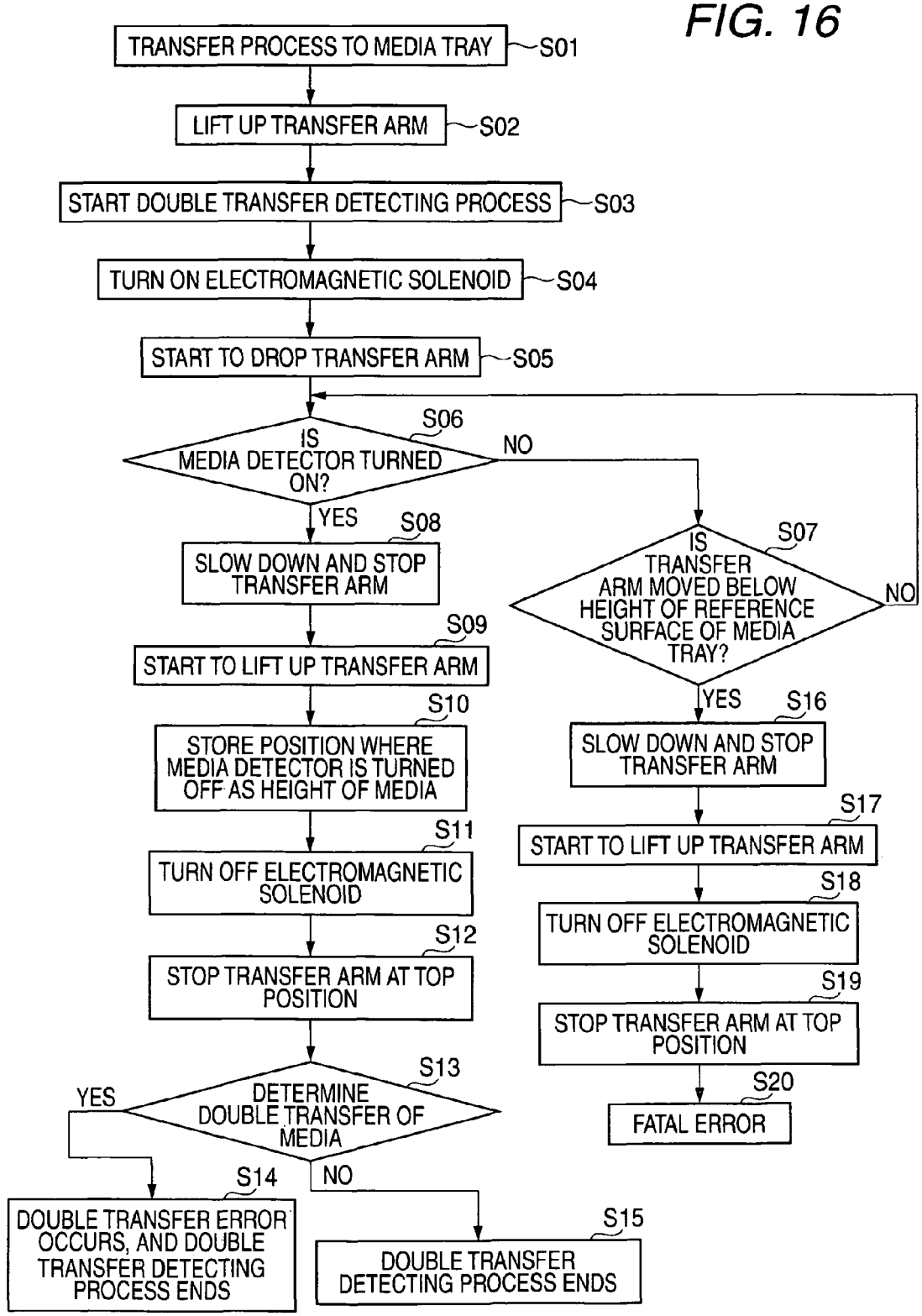
FIG. 16 is a flowchart illustrating a control method according to the invention.

The double transfer detecting process will be described with reference to a flowchart shown in FIG. 16.

First, before the double transfer detecting process, in a process of transferring the media to the media trays (Step S01), the transfer arm 36 of the media transfer mechanism 31 holds the media M stored in the media stackers 21 and 22, moves to transfer the media M to the media tray 45 (or the media tray 41*a*), and loads the media M thereon (Step S01). Then, the transfer arm 36 is lifted to a predetermined height while keeping the media tray 45 at a media delivery position (Step S02). In this case, the predetermined height may be set to, for example, a home position, which is the upper limit of the movement or a middle potion in the vertical direction.

Figure 17:
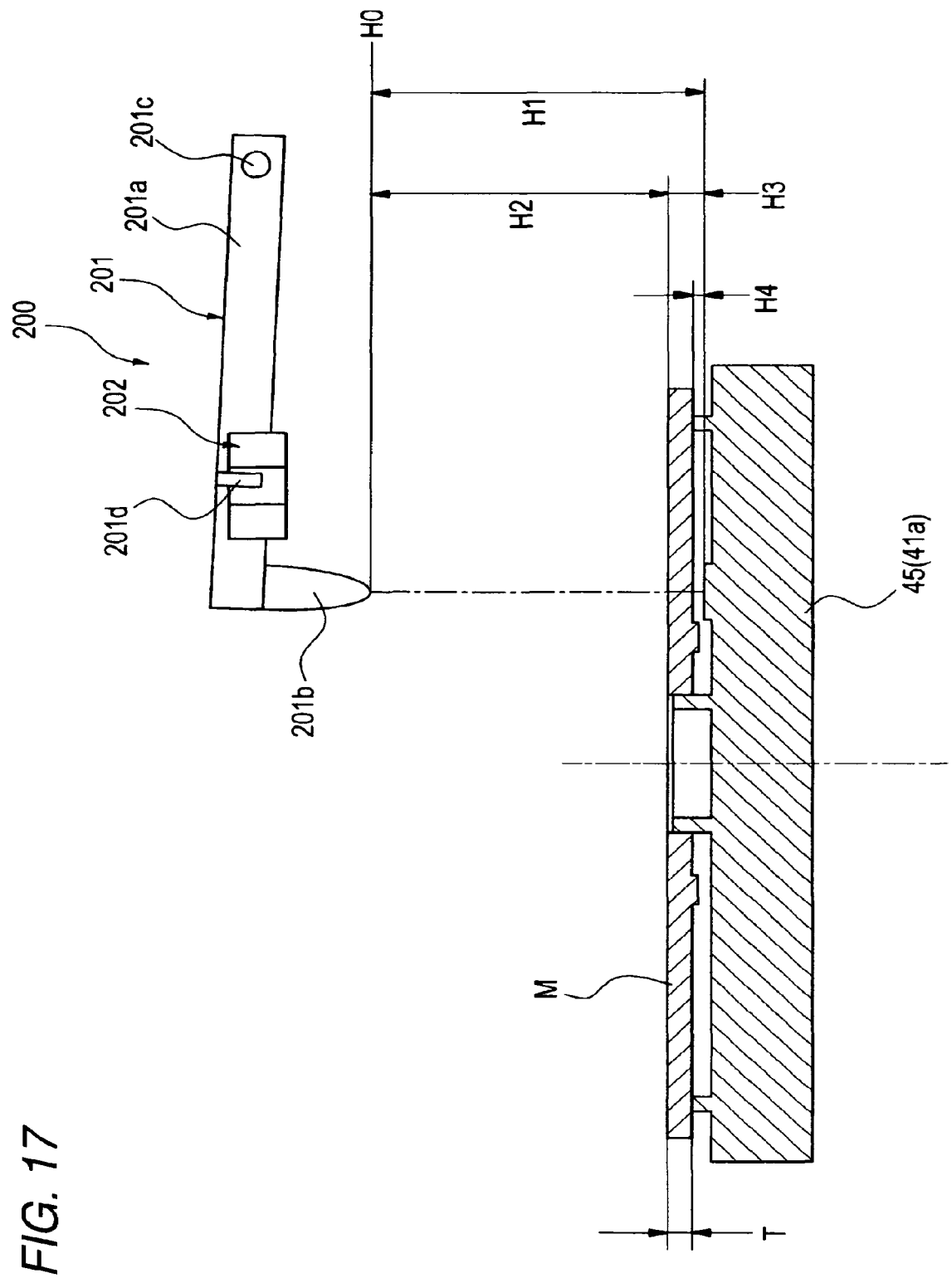
FIG. 17 is a schematic diagram illustrating a double transfer detecting process of the control method according to the invention.

The double transfer detecting process starts while managing the height of the transfer arm 36 on the basis of the predetermined height set in Step S02 by adjusting the number of steps where the driving motor 37 is driven (Step S03). First, the electromagnetic solenoid 176 provided in the transfer arm 36 is turned on (Step S04) to move the three holding claws 141 to 143 so as to be inserted into the central hole of the medium M, and in this state, the transfer arm 36 is moved down (Step S05). In this case, the transfer arm 36 is dropped to a target position that is lower than the height of a reference surface of the media tray 45 by a predetermined distance (for example, a distance corresponding to 100 steps). As shown in FIG. 17, when the position of a lower end of the abutting portion 201*b* of the media detecting mechanism 200 is referred to as a reference height H0 while the transfer arm 36 is disposed at the predetermined height in Step S02, the height of the reference surface of the media tray 45 is a distance H1 between the reference height H0 (the reference position of the transfer arm) and a portion of the media tray 45 with which the abutting portion comes into contact when the transfer arm 36 is dropped. The height of the reference surface of the media tray 45 is stored in an EEPROM as a measured value or a theoretical value during the shipment of the publisher 1. Alternatively, it may be measured when the publisher 1 is turned on, and then stored.

While dropping the transfer arm 36, the detector (media detector) 202 of the media detecting mechanism 200 is monitored (Step S06). When the detector 202 is turned off (Step S06: No), it is determined that the transfer arm 36 reaches the target position that is lower than the height of the reference surface of the media tray 45 by a predetermined distance (Step S07). When the transfer arm 36 does not reach the target position (Step S07: No), the process returns to Step S06.

When the detector 202 is turned on in Step S06, that is, when the abutting portion 201*b* of the detecting lever 201 comes into contact with the upper surface of the medium M and the detecting lever 201 is displaced to the detection position (Step S06: Yes), the transfer arm 36 is slowed down and stops (Step S08).

Then, the transfer arm 36 is lifted up (Step S09), and the detecting lever 201 is displaced to the non-detection position. The position where the detector 202 is turned off is stored as the height H2 ((the distance from the reference position of the transfer arm to the surface of the medium) see FIG. 17) of the medium M (Step S10). In this case, the transfer arm 36 stops once and is then lifted up, with the stop position as a reference, to measure the height H2 of the medium M. Therefore, the accuracy of measurement is high. In addition, when the transfer arm 36 is lifted up at a lower speed than a normal speed until the detector 202 is turned off, it is possible to further improve the accuracy of measurement. In this case, since the lift of the transfer arm 36 is small, the lifting of the transfer arm has little effect on the process speed of the double transfer detecting process.

When the transfer arm 36 is further lifted up after Step S10, the electromagnetic solenoid 176 is turned off at a predetermined position (for example, a middle position in the vertical direction) (Step S11), and the transfer arm 36 stops at the home position, which is the upper limit of the movement (Step S12).

As shown in FIG. 17, a difference H3 between the height H1 of the reference surface of the media tray 45 and the height H2 of the medium M is calculated, and it is determined that the difference H3 is larger than a predetermined threshold value (determination of double transfer; Step S13). The threshold value is obtained by adding the maximum thickness T of a medium considering a variation in the thickness of the medium M used and the warping of the medium M to a distance H4 from the height H1 of the reference surface of the media tray 45 to a lower surface of the medium M. The threshold value may be the maximum height value (T+H4) of the medium M when only one medium M is on the media tray 45.

When the difference H3 is larger than the predetermined threshold value (T+H4) (Step S13: Yes), it is determined that two or more of media M are loaded on the media tray 45. Therefore, a double transfer error signal is output, and a display lamp on the control panel 5 (see FIG. 1) is turned on or the error is displayed on a display of the host computer 101. Then, the double transfer detecting process ends while keeping the media tray 45 at the media delivery position (Step S14).

When the difference H3 is smaller than the predetermined threshold value (Step S13: No), it is determined that only one medium M is loaded on the media tray 45. Therefore, the double transfer detecting process ends (Step S15). After Step S15, the media tray 45 is transferred into the label printer 11 to perform a printing process. When the media tray subjected to the double transfer detecting process is the media tray 41a of the media drive 41, the media tray 41a may be transferred into the media drive 41 to perform a data writing process.

In Steps S06 and S07, when the transfer arm 36 reaches the target position that is lower than the height H1 of the reference surface of the media tray 45 by a predetermined distance while the detector 202 is in an off state (Step S07: Yes), the media tray 45 is not at a normal position (media delivery position), and thus it is determined that errors occur. In this case, the transfer arm 36 is slowed down and then stops once (Step S16), and the transfer arm 36 is lifted up again (Step S17). Then, the electromagnetic solenoid 176 is turned off at a predetermined (for example, a meddle position in the vertical direction) (Step S18), and the transfer arm 36 stops at the home position, which is the upper limit of the movement (Step S19). Then, the fatal error is processed (Step S20).

Alternatively, without performing Step S10, in Step S06, the detection position of the detecting lever 201 may be measured as the height H2 of the medium M. However, in this case, since the movement distance of the transfer arm 36 is long, it is difficult to slow down the falling speed of the transfer arm 36 from the viewpoint of a processing speed. When measurement is performed while the transfer arm 36 falls, it is considered that the accuracy of detection is lowered due to the inertia of the detecting lever 201. However, in this embodiment, since the tilting of the detecting lever 201 is restricted by the attraction force between the magnet 203 and the steel plate 204, it is possible to prevent the accuracy of detection from being lowered.

As described above, according to the media processing apparatus (publisher 1) and a controlling method of the same according to this embodiment, after the media M are transferred to the media trays 41a and 45, the height of the media M loaded on the media trays 41a and 45 is measured. Then, the difference H3 between the measured value H2 and the height H1 of the reference surface of the media tray 41a or 45 is calculated. When the difference H3 is larger than a predetermined threshold value (H4+T), it is determined that two or more media are transferred to the media tray. In this case, the time required for the double transfer detecting process is substantially equal to the time required to measure the height of the media M, and thus the double transfer detecting process can be performed in a relatively short time. Therefore, it is possible to easily and rapidly detect the double transfer of the media M, and thus prevent an internal mechanism of the label printer 11 or the media drive 41 from being damaged.

Further since the media detecting mechanism 200 provided in the transfer arm 36 measures the height of the media M loaded on the media trays 41a and 45, it is easy to measure the height of the media M using the operation of the transfer arm 36, on the basis of the displacement of the transfer arm 36. In addition, a non-contact type distance sensor, such as a reflective optical sensor, other than a contact-type device, such as the media detecting mechanism 200, may be used as the media detecting unit for measuring the height of the media M. When a non-contact type media detecting unit is used, the media detecting unit may be provided at any position other than the transfer.

Furthermore, the media detecting mechanism 200 measures the position of the detecting lever 201 displaced from one of the detection position and the non-detection position as the height of the surface of the media M when the transfer arm 36 is moved. Therefore, it is possible to calculate the height H1 of the reference surface of the media tray 41a or 45 and the height H2 of the media M, using the position of a lower end (reference height H0) of the detecting lever 201 when the transfer arm 36 is positioned at a predetermined height as a reference value. As a result, it is possible to perform a double transfer detection process with a simple calculating process (which determines whether H1−H2=H3 is larger than a threshold value (H4+T)).

Further, the media used in the invention are not limited to the disk media, such as the media M according to the above-described embodiment, but the invention can be applied to polygonal media, such as rectangular media, or elliptical media. In addition, a data recording method is not particularly limited. For example, various recording methods, such as an optical recording method and a magneto-optical recording method, may be used as the data recording method.

What is claimed is:

1. A controlling method of a media processing apparatus, comprising:
    transferring and loading a medium to a media tray provided with a media processing unit which is operable to perform information processing on the medium, by using a transfer arm of a media transfer mechanism;
    acquiring a distance from a surface of the medium loaded on the media tray to a reference surface of the media tray; and
    determining that a double transfer of the medium to the media tray occurs when the acquired distance is larger than a predetermined threshold value.

2. The controlling method as set forth in claim 1, wherein the transfer arm is provided with a media detecting unit which is operable to detect a position of the surface of the media loaded on the media tray.

3. The controlling method as set forth in claim 2, wherein the media detecting unit includes:
a detecting lever having a detecting terminal portion which is configured to come into contact with the surface of the medium and is movable from a non-detection position to a detection position when it comes into contact with the surface of the medium, and movably supported by the transfer arm; and
a detector operable to detect that the detecting lever reaches the detection position; and
the media detecting unit detects a position of the detecting lever when the detecting lever is moved from one of the detection position and the non-detection position to the other of the detection position and the non-detection position by the movement of the transfer arm, as the position of the surface of the medium.

4. The controlling method as set forth in claim 3, further comprising:
stopping the transfer arm when detecting lever is moved to the detection position; and
lifting up the transfer arm until the detecting lever is moved to the non-detection position,
wherein in the acquiring, the distance from the position of the detecting lever when the detecting lever is moved to the non-detection position to the reference surface is acquired as the distance from the surface of the medium to the reference surface.

5. The controlling method as set forth in claim 1, wherein the media detecting unit includes a non-contact type sensor operable to measure the distance from the surface of the medium to the reference surface of the media tray.

* * * * *